US011308956B2

(12) United States Patent
Nagasaka

(10) Patent No.: US 11,308,956 B2
(45) Date of Patent: Apr. 19, 2022

(54) INFORMATION PROCESSING DEVICE, PROGRAM, AND INFORMATION PROCESSING METHOD

(71) Applicant: Sony Corporation, Tokyo (JP)

(72) Inventor: Hideo Nagasaka, Tokyo (JP)

(73) Assignee: SONY CORPORATION, Tokyo (JP)

(*) Notice: Subject to any disclaimer, the term of this patent is extended or adjusted under 35 U.S.C. 154(b) by 212 days.

(21) Appl. No.: 16/636,038

(22) PCT Filed: May 10, 2018

(86) PCT No.: PCT/JP2018/018164
§ 371 (c)(1),
(2) Date: Feb. 3, 2020

(87) PCT Pub. No.: WO2019/031007
PCT Pub. Date: Feb. 14, 2019

(65) Prior Publication Data
US 2020/0243083 A1 Jul. 30, 2020

(30) Foreign Application Priority Data
Aug. 10, 2017 (JP) .............................. JP2017-154966

(51) Int. Cl.
*G10L 15/00* (2013.01)
*G10L 15/22* (2006.01)
(Continued)

(52) U.S. Cl.
CPC .............. *G10L 15/22* (2013.01); *H04L 51/24* (2013.01); *H04L 51/26* (2013.01); *G10L 2015/223* (2013.01)

(58) Field of Classification Search
CPC ......... H04L 51/26; H04L 51/36; G06F 9/542; G06F 9/546
See application file for complete search history.

(56) References Cited

U.S. PATENT DOCUMENTS 7,181,495 B2 * 2/2007 Skladman ............... H04L 51/12
709/203
2003/0195937 A1 * 10/2003 Kircher, Jr. ........... H04L 67/306
709/207

(Continued)

FOREIGN PATENT DOCUMENTS

JP 2003-30113 A 1/2003
JP 2004-506961 A 3/2004
(Continued)

OTHER PUBLICATIONS

International Search Report and Written Opinion dated Jul. 31, 2018 for PCT/JP2018/018164 filed on May 10, 2018, 14 pages including English Translation of the International Search Report.

*Primary Examiner* — Daniel Abebe
(74) *Attorney, Agent, or Firm* — Xsensus LLP

(57) ABSTRACT

To provide an information processing apparatus capable of notifying a user of a message at an appropriate timing.

An information processing apparatus includes: a first acquiring unit that acquires first messages transmitted from other users to a user in a service configured to transmit and receive messages between the user and the other users; a second acquiring unit that acquires user information regarding the user; a determining unit that determines whether or not to notify the user of the first messages on the basis of the first messages and the user information; and a notification control unit that controls notification processing of notifying the user of the first messages determined to be notified to the user by the determining unit.

14 Claims, 13 Drawing Sheets

(51) Int. Cl.
*H04L 51/224* (2022.01)
*H04L 51/226* (2022.01)

(56) References Cited

U.S. PATENT DOCUMENTS

| | | | |
|---|---|---|---|
| 2006/0031782 A1* | 2/2006 | Houmura | H04L 51/24 |
| | | | 715/808 |
| 2006/0235933 A1* | 10/2006 | Baluja | H04L 51/26 |
| | | | 709/207 |
| 2009/0204681 A1 | 8/2009 | Sun | |
| 2010/0281409 A1* | 11/2010 | Rainisto | G06F 9/451 |
| | | | 715/767 |
| 2011/0119258 A1* | 5/2011 | Forutanpour | H04L 51/28 |
| | | | 707/723 |
| 2012/0149342 A1* | 6/2012 | Cohen | H04L 51/26 |
| | | | 455/412.2 |
| 2014/0189030 A1 | 7/2014 | Benchenaa et al. | |

FOREIGN PATENT DOCUMENTS

| | | |
|---|---|---|
| JP | 2010-231351 A | 10/2010 |
| JP | 2012-221278 A | 11/2012 |
| JP | 2015-176557 A | 10/2015 |
| JP | 2016-095582 A | 5/2016 |
| JP | 2016-173726 A | 9/2016 |
| JP | 2016-212478 A | 12/2016 |

* cited by examiner

FIG. 9
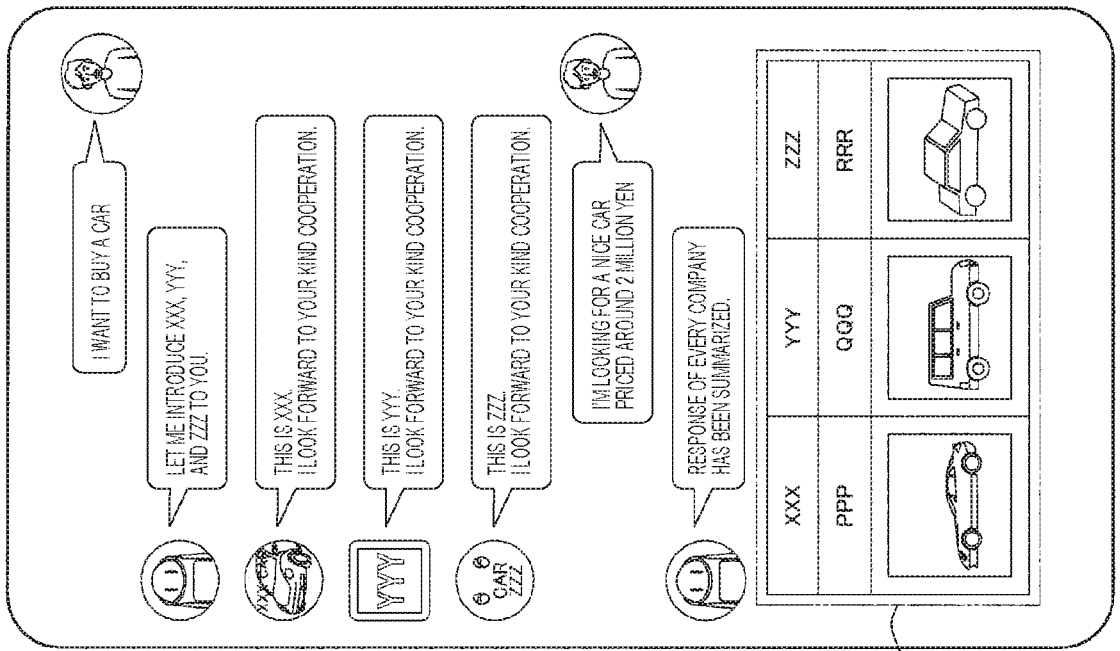
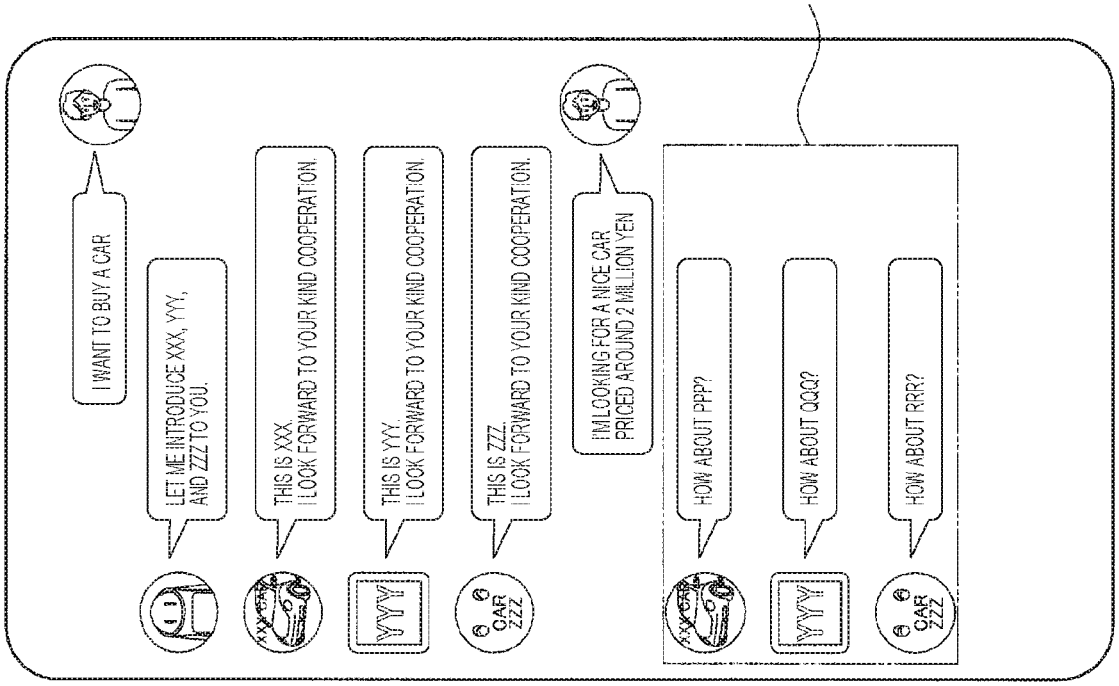

INFORMATION PROCESSING DEVICE, PROGRAM, AND INFORMATION PROCESSING METHOD

CROSS-REFERENCE TO RELATED APPLICATIONS

The present application is based on PCT filing PCT/JP2018/018164, filed May 10, 2018, which claims priority to JP 2017-154966, filed Aug. 10, 2017, the entire contents of each are incorporated herein by reference.

TECHNICAL FIELD

The present disclosure relates to an information processing apparatus, a program, and an information processing method.

BACKGROUND ART

In recent years, various communication services such as mail, chat, a messaging application, social networking service (SNS), and the like, have appeared. In these communication services, users can transmit and receive messages in a one-to-one manner, a one-to-many manner, or a many-to-many manner. A frequency of communication via the communication service has been increasing more and more in recent years, such that development of a technology of improving convenience of the communication service has been demanded. As an example, Patent Document 1 discloses a technology of controlling a timing of informing a user that a message has been received according to a state of the user.

CITATION LIST

Patent Document

Patent Document 1: Japanese Patent Application Laid-Open No. 2016-212478

SUMMARY OF THE INVENTION

Problems to be Solved by the Invention

However, even though the timing of informing the user that the message has been received according to the state of the user can be controlled, the user may be notified of a message that is unnecessary for the user.

Therefore, the present disclosure proposes a new and improved information processing apparatus, program, and information processing method capable of further improving convenience of a communication service.

Solutions to Problems

According to the present disclosure, there is provided an information processing apparatus including: a first acquiring unit that acquires first messages transmitted from other users to a user in a service configured to transmit and receive messages between the user and the other users; a second acquiring unit that acquires user information regarding the user; a determining unit that determines whether or not to notify the user of the first messages on the basis of the first messages and the user information; and a control unit that controls notification processing of notifying the user of the first messages determined to be notified to the user by the determining unit.

Furthermore, according to the present disclosure, there is provided a program for causing a computer to function as: a first acquiring unit that acquires first messages transmitted from other users to a user in a service configured to transmit and receive messages between the user and the other users; a second acquiring unit that acquires user information regarding the user; a determining unit that determines whether or not to notify the user of the first messages on the basis of the first messages and the user information; and a control unit that controls notification processing of notifying the user of the first messages determined to be notified to the user by the determining unit.

In addition, according to the present disclosure, there is provided an information processing method executed by a processor, including: acquiring first messages transmitted from other users to a user in a service configured to transmit and receive messages between the user and the other users; acquiring user information regarding the user; determining whether or not to notify the user of the first messages on the basis of the first messages and the user information; and controlling notification processing of notifying the user of the first messages determined to be notified to the user by a determining unit.

Effects of the Invention

As described above, according to the present disclosure, it is possible to provide a new and improved information processing apparatus, information processing method, and program capable of further improving convenience of a communication service.

Note that the effect described above is not necessarily restrictive, and any effect set forth in the present specification or other effects that can be grasped from the present specification may be accomplished together with or instead of the effect described above.

BRIEF DESCRIPTION OF DRAWINGS

FIG. 9 is an explanatory diagram illustrating an example of a user interface when messages of a plurality of accounts according to the embodiment are organized in one message and then output.

MODE FOR CARRYING OUT THE INVENTION

Figure 1:
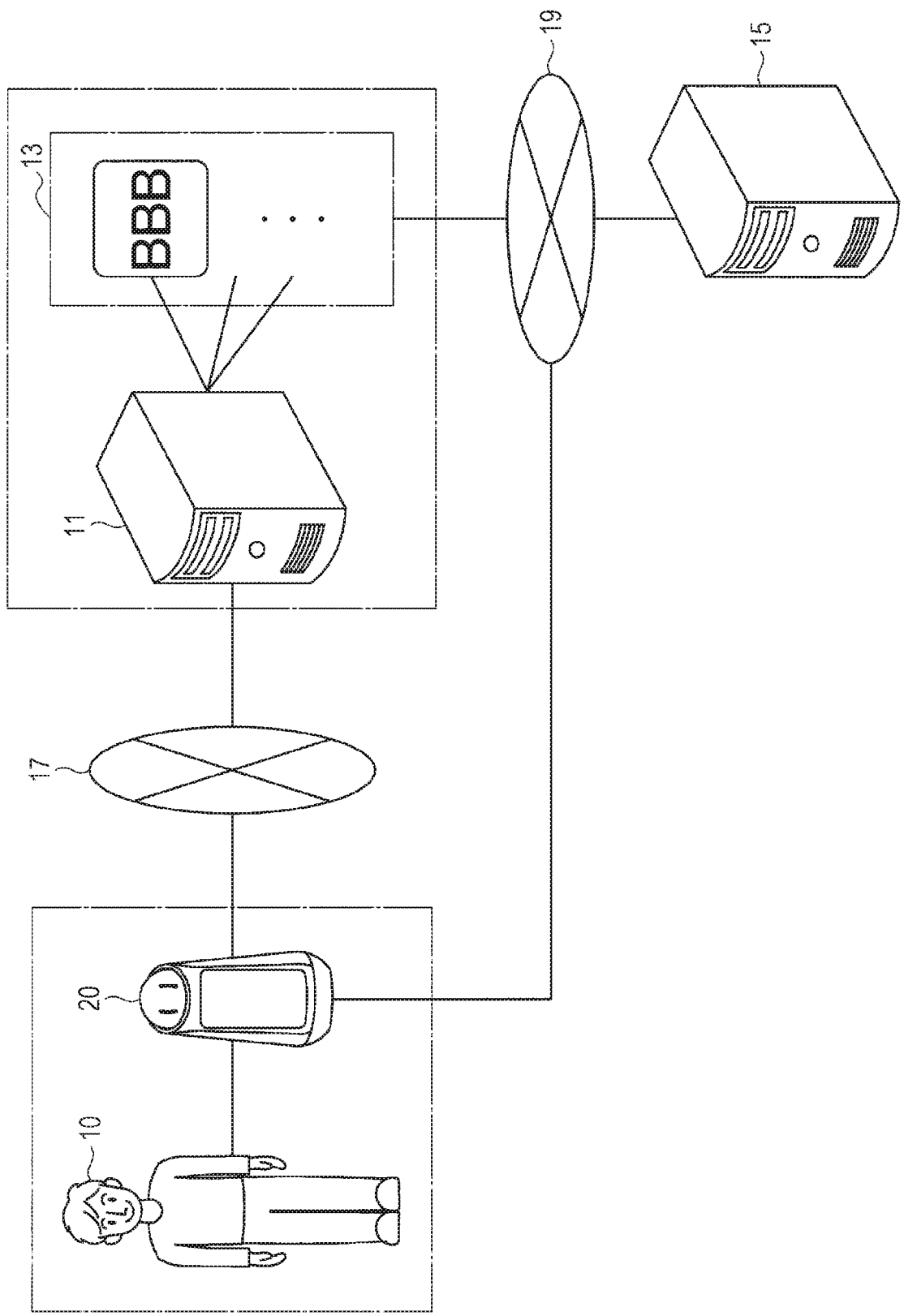
FIG. 1 is an explanatory diagram illustrating an overview of a communication system according to an embodiment of the present disclosure.

Hereinafter, preferred embodiments of the present disclosure will be described in detail with reference to the accompanying drawings. Note that in the present specification and the drawings, components having substantially the same functional configuration will be denoted by the same reference numerals and an overlapping description will be omitted.

Note that a description will be given in the following order.

1. Overview
2. Embodiment of the present disclosure
2.1. Functional configuration example
2.2. Operation example
3. Hardware configuration
4. Summary

1. Overview

Overview of Communication Service

In recent years, various communication services such as mail, chat, a messaging application, social networking service (SNS), and the like, have appeared. In these communication services, users can transmit and receive messages in a one-to-one manner, a one-to-many manner, or a many-to-many manner.

A user is typically a person. The user may be, for example, an organization such as an enterprise, an association or the like, in addition to the person. Furthermore, the user may be an artificial intelligence (AI).

The message typically includes text information. In addition, the message can include an image (a still image or a moving image), a voice, or other electronic data.

Hereinafter, in a communication service, transmitting a message to another user by a user is called an "utterance", and performing communication by transmitting and receiving messages between users is called an "interaction". An utterance content (that is, a content of the message) is created by the user.

An account unique to a user is allocated to the user. The account is information for identifying the user in the communication service. An example of the account can include a mail address, a user ID and the like. The transmission and reception of messages between users are realized as transmission and reception of messages between accounts. Hereinafter, for simplicity of explanation, the transmission and reception of the messages between the accounts will be described as transmission and reception of messages between users. For example, transmitting a message from a user's own account to another user's account by a user is also referred to as transmitting a message to another user by a user. The same applies to reception.

The user creates an account when subscribing to the communication service. The user can perform an interaction with another user after creating the account. The user may link another specific user's account to the user's own account. An effect of the linking differs depending on the communication service. Typically, the user is able to perform an interaction with another user linked to him/her, and is subjected to a certain restriction imposed on an interaction with another user unlinked to him/her. Here, examples of the restriction include that an interaction cannot be performed (that is, message transmission and reception are not permitted). In this case, the user can transmit and receive a message to and from another user whose account is registered, and cannot transmit and receive a message to and from another user whose account is not registered. Hereinafter, linking another specific user's account to the user's own account, that is, enabling transmission and reception of a message between the user and another specific user, is referred to as "account registration". Of course, the user can also cancel the linking, that is, disable the transmission and reception of the message between the user and another specific user. Hereinafter, canceling the linking is referred to as "canceling the account registration". Furthermore, a state where the linking is not made is also referred to as an unregistered state.

The communication service can be used by various apparatuses. The user uses the communication service using a terminal apparatus such as a mobile phone, a smartphone, a personal computer (PC), an agent device, a wearable device, or the like. Here, the agent device is a device having a conversation function with a user, a network communication function and the like, and may be, for example, a robot. For example, a client application provided from the communication service is installed in the terminal apparatus, and the user uses the communication service by operating the client application. The terminal apparatus typically includes a display apparatus such as a display and the like, and outputs a screen related to the communication service. For example, the terminal apparatus displays a screen including an utterance content of the user or another user or an interaction content including a plurality of utterance contents. Examples of the screen including the interaction content can include a screen in which the utterance contents transmitted and received between the user and another user are arranged in time-series order within one screen. Such a screen in which the utterance contents transmitted and received between the user and another user are arranged in time-series order within one screen is also referred to as a "room". Furthermore, a gathering of a user and another user who can interact with each other in the room is also referred to as a "group", and one room is associated with one group.

The room is newly created when the user transmits a message to another user or when the user receives a message from another user. Then, the interaction content transmitted and received after the room is created is additionally displayed in the room. In the room, it is possible for the user to perform an interaction with another user in a one-to-one manner and for the user to perform an interaction with a plurality of other users. Two or more users who can interact with each other in the room are associated with the group associated with the room. Associating the user with the group is also referred to as inviting the user. The user invited to the group can utter in the room to interact with other users associated with the group. An utterance content in the room is transmitted to all other users other than the uttering user among the users associated with the group. Note that the created room and group can be typically deleted by a user instruction.

The user can actively confirm that the message has been received or a content of the message after receiving the message. In addition, the user may know that the message has been received or a content of the message by being notified that the message has been received or of the content of the message, after receiving the message. The communication service has a notification function of the message for realizing this notification. For example, when the user receives the message, the communication service notifies the user that the message has been received or the content of the message, via the terminal apparatus. The terminal apparatus can perform the notification described above by voice output, display, ringing, or the like. In particular, a state where the content of the message has not been notified to the user is hereinafter referred to as "unopened".

The user can set ON/OFF of the notification function of the message in the communication service. The user can be notified that the message has been received by setting the notification function to ON. On the other hand, the user cannot be notified that the message has been received by setting the notification function to OFF. A setting for ON/OFF of the notification function is hereinafter also referred to as a notification setting. The notification setting can be set for every other user. That is, in a case where a message has been received from another user whose notification setting is ON, a notification is made, and in a case where a message has been received from another user whose notification setting is OFF, a notification is not made. The notification setting can also be set for every room. That is, in a case where a message has been received in a room whose notification setting is ON, a notification is made, and in a case where a message has been received in a room whose notification setting is OFF, a notification is not made. Note that in an embodiment of the present disclosure, a "priority" means a notification setting, a "first priority" means that a notification setting is ON, and a "second priority" means that a notification setting is OFF.

Hereinabove, the overview of the communication service has been described. Next, an overview of a communication system according to an embodiment of the present disclosure will be described with reference to FIG. 1.

Overview of Communication System

FIG. 1 is an explanatory diagram illustrating an overview of a communication system according to an embodiment of the present disclosure. As illustrated in FIG. 1, the communication system according to the embodiment of the present disclosure includes a cooperation service server 11, a content distribution server 15, a network 17, a network 19, and a notification control apparatus 20. The notification control apparatus 20 is connected to the cooperation service server 11 via the network 17, and is connected to the content distribution server 15 via the network 19. Furthermore, another user 13 is connected to the content distribution server 15 via the network 19.

The user 10 interacts with another user 13 in a communication service provided by the cooperation service server 11. The user 10 transmits a message to another user 13 to the cooperation service server 11 and receives a message from another user 13 from the cooperation service server 11, when performing the interaction with another user 13. The user 10 uses the notification control apparatus 20 as a terminal apparatus for using the communication service. That is, the user 10 performs the interaction with another user 13 via the notification control apparatus 20. The user 10 can also receive content distributed from the content distribution server 15. Here, the "content" refers to music, an image (still image/moving image), and the like.

The cooperation service server 11 is a server for providing the communication service. The cooperation service server 11 stores various information such as accounts of the user 10 and another user 13, a linking relationship between the accounts, and a notification setting, and the like, and performs message transmission/reception processing between the user 10 and another user 13 on the basis of these information. Furthermore, the cooperation service server 11 also performs processing for notifying the user 10 or another user 13 that the message has been received. For example, the cooperation service server 11 transmits information indicating that the cooperation service server 11 has received a message from another user 13 to the user 10 to the notification control apparatus 20. The cooperation service server 11 transmits the message to the notification control apparatus 20 in a case where there was a transmission request of the message from the notification control apparatus 20. Note that in a case where a plurality of communication services exists, a plurality of cooperation service servers 11 may exist.

Another user 13 is a user who interacts with the user 10 in the communication service provided by the cooperation service server 11. A plurality of other users 13 may exist. Another user 13 transmits a message to the user 10 to the cooperation service server 11 and receives a message from the user 10 from the cooperation service server 11, when performing the interaction with the user 10. Furthermore, another user 13 distributes the content provided to the user 10 to the content distribution server 15.

The content distribution server 15 is a server for managing and distributing content. For example, the content distribution server 15 manages the content transmitted from the another user 13 and outputs the content to the notification control apparatus 20 in a case where there was a request from the notification control apparatus 20. Note that a plurality of content distribution servers 15 may exist according to a type of service that distributes the content, a type of content, and the like.

The notification control apparatus 20 is an apparatus that interacts with the user 10. The notification control apparatus 20 functions as a terminal apparatus for the user 10 to use the communication service. For example, the notification control apparatus 20 performs the account registration, performs the notification setting, displays the room, or transmits and receives the message to and from another user 13 on the basis of a user instruction.

In particular, the notification control apparatus 20 performs control of determination processing of determining whether or not to notify the user 10 of the message received in the communication service provided by the cooperation service server 11 and notification processing of notifying the user 10 of the message. Furthermore, the notification control apparatus 20 has a conversational artificial intelligence (AI) function, and has a conversation with the user 10 by analyzing a content of a talk of the user 10 and generating and outputting a reply. The notification control apparatus 20 can perform the determination processing and the notification processing on the basis of the conversation with the user 10.

For example, the notification control apparatus 20 collects information regarding the user 10 while conversing with the user 10. Then, the notification control apparatus 20 acquires a message including information useful for the user 10 from the cooperation service server 11 on the basis of a content of the conversation with the user 10, and notifies the user 10 of the message. Of course, the notification control apparatus 20 may perform the notification processing according to an action or a state of the user other than the conversation. In such a manner, the user 10 can know useful information at an appropriate timing.

Note that the notification control apparatus 20 is typically realized as a physically independent apparatus. In addition, a function as the notification control apparatus 20 may be implemented as an application and be mounted in a terminal apparatus such as a smartphone, a tablet terminal, a PC, a wearable terminal, an agent device, or the like. That is, the notification control apparatus 20 can be realized as an arbitrary terminal apparatus. Furthermore, a plurality of notification control apparatuses 20 may be associated with the user 10. For example, the user 10 may interact with the notification control apparatus 20 realized as a smartphone while being out, and interact with the notification control apparatus 20 realized as a home device at home.

Hereinabove, the overview of the communication system has been described above with reference to FIG. 1. Next, a functional configuration example of the notification control apparatus 20 according to the embodiment of the present disclosure will be described.

2. Embodiment of the Present Disclosure

2.1. Functional Configuration Example

Figure 2:
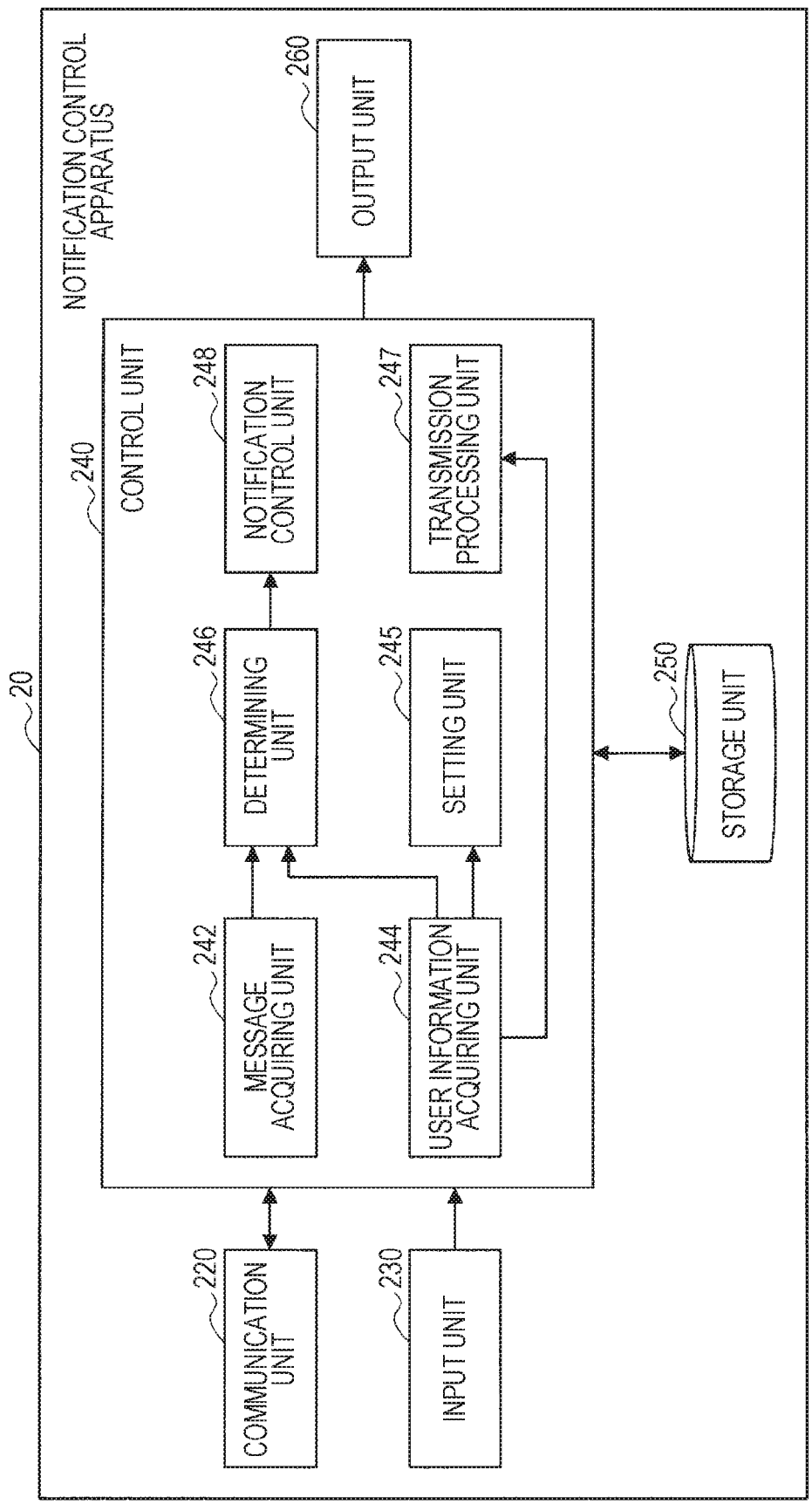
FIG. 2 is an explanatory diagram illustrating a functional configuration example of a notification control apparatus according to the embodiment.

FIG. 2 is an explanatory diagram illustrating a functional configuration example of the notification control apparatus 20 according to the embodiment of the present disclosure. Hereinafter, a functional configuration example of the notification control apparatus 20 according to the embodiment of the present disclosure will be described with reference to FIG. 2.

As illustrated in FIG. 2, the notification control apparatus 20 according to the embodiment of the present disclosure includes a communication unit 220, an input unit 230, a control unit 240, a storage unit 250, and an output unit 260.

(1) Communication Unit 220

The communication unit 220 is an interface that connects the notification control apparatus 20 and the cooperation service server 11 to each other and connects the notification control apparatus 20 and the content distribution server 15 to each other, and the notification control apparatus 20 communicates information with the cooperation service server 11 and the content distribution server 15. For example, the communication unit 220 transmits an instruction of processing related to acquisition and registration of information regarding the accounts, such as the accounts of the user 10 and another user 13, the linking relationship between the accounts, and the like, in the communication with the cooperation service server 11. Furthermore, the communication unit 220 receives information regarding a message, including a message to be notified to the user 10 and a notification setting. Furthermore, the communication unit 220 receives profile information such as a purchase history and the like of the user 10 as user information. Furthermore, the communication unit 220 receives content to be output according to a request of the user 10, from the content distribution server 15, in the communication with the content distribution server 15.

(2) Input Unit 230

The input unit 230 has a function of receiving input of information. The input unit 230 includes various sensors such as a microphone, a camera, a touch panel, biological information, and the like, and acquires user information. For example, the input unit 230 acquires an interaction content with the user 10 by the microphone as the user information. Furthermore, the input unit 230 acquires a real-time state of the user 10 by the camera, the sensor, and the like as the user information. Note that in a case where the notification control apparatus 20 includes a display having a touch panel function, the input unit 230 may acquire information input by the user 10 via the touch panel as the user information.

(3) Control Unit 240

The control unit 240 has a function of determining whether or not to notify the user 10 of the message on the basis of the information regarding the message and the user information acquired by the communication unit 220 and the input unit 230, respectively, and outputting information regarding output processing based on a determination result to the communication unit 220 and the output unit 260. Furthermore, the control unit 240 also has a function of outputting the information regarding the message and the user information acquired by the communication unit 220 and the input unit 230, respectively, to the storage unit 250, and a function of acquiring the information regarding the message and the user information from the storage unit 250.

Furthermore, the control unit 240 according to the embodiment of the present disclosure includes a message acquiring unit 242, a user information acquiring unit 244, a setting unit 245, a determining unit 246, a transmission processing unit 247, and a notification control unit 248, as illustrated in FIG. 2.

Message Acquiring Unit 242

The message acquiring unit 242 (first acquiring unit) has a function of acquiring information regarding a message (first message) transmitted from another user 13 to the user 10 among the information acquired by the communication unit 220 and outputting the acquired information regarding the message to the determining unit 246 and the storage unit 250. For example, the message acquiring unit 242 acquires an unopened message among the acquired information regarding the message, and outputs the unopened message to the determining unit 246 and the storage unit 250. Note that the message acquiring unit 242 may acquire the information regarding the message from the storage unit 250.

The information regarding the message acquired by the message acquiring unit 242 may include an account ID, a reception date and time, a category, a message, content information, and the like, of another user 13, as illustrated in Table 1 below.

TABLE 1

Example of information regarding message
acquired by message acquiring unit 242

| Account ID of another user 13 | Reception date and time | Category | Message | Content/content information |
|---|---|---|---|---|
| BBB | 2017 Jul. 20 10:05:08 | Music | Here comes a new song! | http://www.music.- |
| BBB | 2017 Jul. 20 10:05:08 | Music | Please come to my live show! | — |
| DDD | 2017 Jul. 20 10:15:32 | Car | Here comes a new car! | http://www.car.- |
| ... | ... | ... | ... | ... |

Note that the message may include content itself or may include content information indicating an arrangement location of content. The content information indicating the arrangement location of the content is typically uniform resource locator (URL) information.

User Information Acquiring Unit 244

The user information acquiring unit 244 (second acquiring unit) has a function of acquiring user information among the information acquired by the communication unit 220 and the input unit 230. The user information acquiring unit 244 has a function of outputting the acquired user information to the setting unit 245, the determining unit 246, the transmission processing unit 247, and the storage unit 250. Note that the user information acquiring unit 244 may acquire the user information from the storage unit 250.

The user information includes an utterance content, a state, and input information of the user 10 acquired by the input unit 230. Furthermore, the user information includes profile information (a user, a gender, a date of birth, an address, a hobby, operation history, purchase history, and the like) of the user 10 acquired by the communication unit 220, and a notification setting of a message. Information regarding the notification setting includes a user, an account, and a notification setting, as illustrated in Table 2 below.

TABLE 2

Example of information regarding notification setting
acquired by user information acquiring unit 244

| User | Account | Notification setting |
|---|---|---|
| EEE | GGG | ON |
| EEE | HHH | OFF |
| FFF | GGG | OFF |
| ... | ... | ... |

Setting Unit 245

The setting unit 245 has a function of performing a setting related to the user 10 in the communication service. For example, the setting unit 245 performs various settings related to the user 10 by accessing the cooperation service server 11 to use an application programming interface (API) related to a setting change provided by the communication service.

The setting unit 245 performs a setting for whether or not to permit transmission and reception of a message between the user 10 and another user 13 in the communication service. In other words, the setting unit 245 performs a setting for whether or not to enable the user 10 to transmit and receive the message to and from another user 13 in the communication service. For example, the setting unit 245 permits the user 10 to transmit and receive the message to and from another user 13 by registering an account of another user 13. Furthermore, the setting unit 245 does not permit the user 10 to transmit and receive the message (that is, prohibits the user from transmitting and receiving the message) to and from another user 13 by canceling the account registration of another user 13.

In addition, the setting unit 245 may perform various settings such as the notification setting and the like. Furthermore, the setting unit 245 also performs creation/deletion of a room, invitation of another user 13 to a group, and the like.

Determining Unit 246

The determining unit 246 has a function of determining whether or not to notify the user 10 of the message on the basis of information acquired from the message acquiring unit 242 and the user information acquiring unit 244 and outputting a determination result to the notification control unit 248. The determining unit 246 acquires information regarding the unopened message from the message acquiring unit 242, and acquires the user information from the user information acquiring unit 244. The determining unit 246 determines to notify the user 10 of the message in a case where a notification setting of another user 13 who is a transmission source of the unopened message, included in the acquired user information, is ON. In a case where the notification determination is OFF, the determining unit 246 separately determines whether or not to notify the user 10 of the message on the basis of the acquired user information.

Here, the determining unit 246 causes the storage unit 250 to hold the message determined not to be notified. The determining unit 246 makes a notification determination as described later on the message held in the storage unit 250 at a predetermined period. That is, the determining unit 246 can determine to notify the user of a message determined not to be notified at a timing of acquiring the message at the subsequent appropriate timing.

Transmission Processing Unit 247

The transmission processing unit 247 has a function of instructing the communication service to generate and transmit a message from the user 10 to another user 13 in the communication service, on the basis of the user information. For example, the transmission processing unit 247 instructs the communication service to generate and transmit a message by accessing the cooperation service server 11 to use an API related to generation and transmission of a message provided by the communication service. Note that the message transmitted from the user 10 to another user 13 is hereinafter also referred to as a "second message".

The transmission processing unit 247 instructs the communication service to generate and transmit the message on the basis of the user information of the user 10. For example, the transmission processing unit 247 acquires information regarding an utterance of the user 10 from the user information acquired by the user information acquiring unit 244. In a case where an utterance to another user 13 exists in an acquired utterance content of the user 10, the transmission processing unit 247 causes the communication service to create the message based on the utterance content of the user 10.

As described above, the notification control apparatus 20 has the conversational AI function. The transmission processing unit 247 instructs the communication service to transmit a message created by a conversational AI to another user 13.

Notification Control Unit 248

The notification control unit 248 has a function of controlling the notification processing of the notification control apparatus 20. For example, the notification control unit 248 performs processing for notifying the user 10 of the message determined to be notified to the user 10 by the determining unit 246. Moreover, the notification control unit 248 performs output control such as selection of an output means (a voice, an image, a text, and the like) that notifies the user of the message, control of an output setting, and the like, on the basis of the user information and a content of the message.

Note that the notification control unit 248 can control the output unit 260 to output the message, but may transmit the message to an external output device via the communication unit 220 and output the content to the external output device. The same applies to the content.

As described above, the notification control apparatus 20 has the conversational AI function. The notification control unit 248 notifies the user 10 of the message created by the conversational AI.

(4) Storage Unit 250

The storage unit 250 has a function of storing the information regarding the message acquired by the message acquiring unit 242 and the user information acquired by the user information acquiring unit 244. The storage unit 250 stores the information regarding the message illustrated in Table 1, for example, in a message unit. Furthermore, the storage unit 250 stores the profile information of the user acquired by the user information acquiring unit 244 in a user unit, and stores the information regarding the notification setting acquired by the user information acquiring unit 244 in an account unit associated with the user.

Note that a method of separately managing the profile information of the user 10 and the notification setting has been described in the above description, but a method of managing each information is not particularly limited. For example, the storage unit 250 may collectively manage the profile information and the notification setting.

(5) Output Unit 260

The output unit 260 outputs the message determined to be notified to the user 10 by the control unit 240 and the content. For example, the output unit 260 may output a read message content from a voice output device. Furthermore, the output unit 260 may output a message content to a display by a text. Similarly, the output unit 260 may output the content from the voice output device or the display. Note that processing in which the output unit 260 selects which device the message or the content is output from is controlled by the notification control unit 248.

Hereinabove, the functional configuration example of the notification control apparatus 20 according to the embodiment of the present disclosure has been described with reference to FIG. 2. Next, an operation example of the communication system according to the embodiment of the present disclosure will be described.

2.2. Operation Example

[2.2.1. Operation Example of Interaction Processing]

The communication system according to the embodiment of the present disclosure is a system in which the notification control apparatus 20 can notify the user 10 of the message received from another user 13 at an appropriate timing by analyzing the information acquired from the user 10 and the cooperation service server 11.

The notification control apparatus 20 can perform communication with the user 10 so as to have a conversation with the user 10 by outputting a voice. Hereinafter, a case where the notification control apparatus 20 outputs a voice for performing communication with the user 10 and a case where the user 10 generates a voice for performing communication with the notification control apparatus 20 are referred to as an "utterance".

An utterance content of the notification control apparatus 20 is created by an AI. The notification control apparatus 20 outputs the utterance content created by the AI by a voice. Furthermore, the notification control apparatus 20 can perform communication with the user 10 by outputting the utterance content of the notification control apparatus 20 by a text. For example, the notification control apparatus 20 outputs the utterance content of the notification control apparatus 20 to a screen and the like displayed by a display included in the notification control apparatus 20 or a display which is an external output device. Hereinafter, performing the communication between the notification control apparatus 20 and the user 10 by the utterance or the text is referred to as an "interaction".

The notification control apparatus 20 can acquire the profile information of the user 10 by the interaction with the user 10. The notification control apparatus 20 acquires the profile information by analyzing the utterance content of the user 10 without explicitly requesting the user 10 to input the profile information. Therefore, the notification control apparatus 20 can acquire the profile information of the user 10 without causing the user 10 to feel a resistance of the user 10 to provision of the profile information. Furthermore, in a case where the profile information is acquired from a plurality of users 10, the notification control apparatus 20 can also discriminate each user 10 on the basis of the acquired profile information. Moreover, the notification control apparatus 20 discriminates the plurality of users 10, and then notifies each user 10 of messages or content matched to each user 10. For example, in a case where the user 10 shares one notification control apparatus 20 with a family, the notification control apparatus 20 discriminates who the family is, and then provides messages or content. Therefore, even though the user 10 shares one notification control apparatus 20 with the plurality of users 10, it is possible to obtain different experiences matched to each user 10.

The notification control apparatus 20 acquires the profile information from the interaction with the user 10, but when the profile information is acquired from the entire utterance of the user 10, unnecessary information is also acquired, which may cause a reduction in a storage capacity. Therefore, the notification control apparatus 20 may set a reference value for every keyword and preferentially acquire information regarding a keyword whose reference value exceeds a certain threshold, for example.

The notification control apparatus 20 analyzes the interaction with the user 10, and creates an utterance content to the user 10 on the basis of analysis result. The notification control apparatus 20 can perform the interaction with the user 10 by outputting the created utterance content by, for example, a voice output device. Furthermore, the notification control apparatus 20 can also output an interaction content with the user 10 on the display in time-series order by a text, and can also leave the interaction content with the user 10 as a history.

Figure 3:
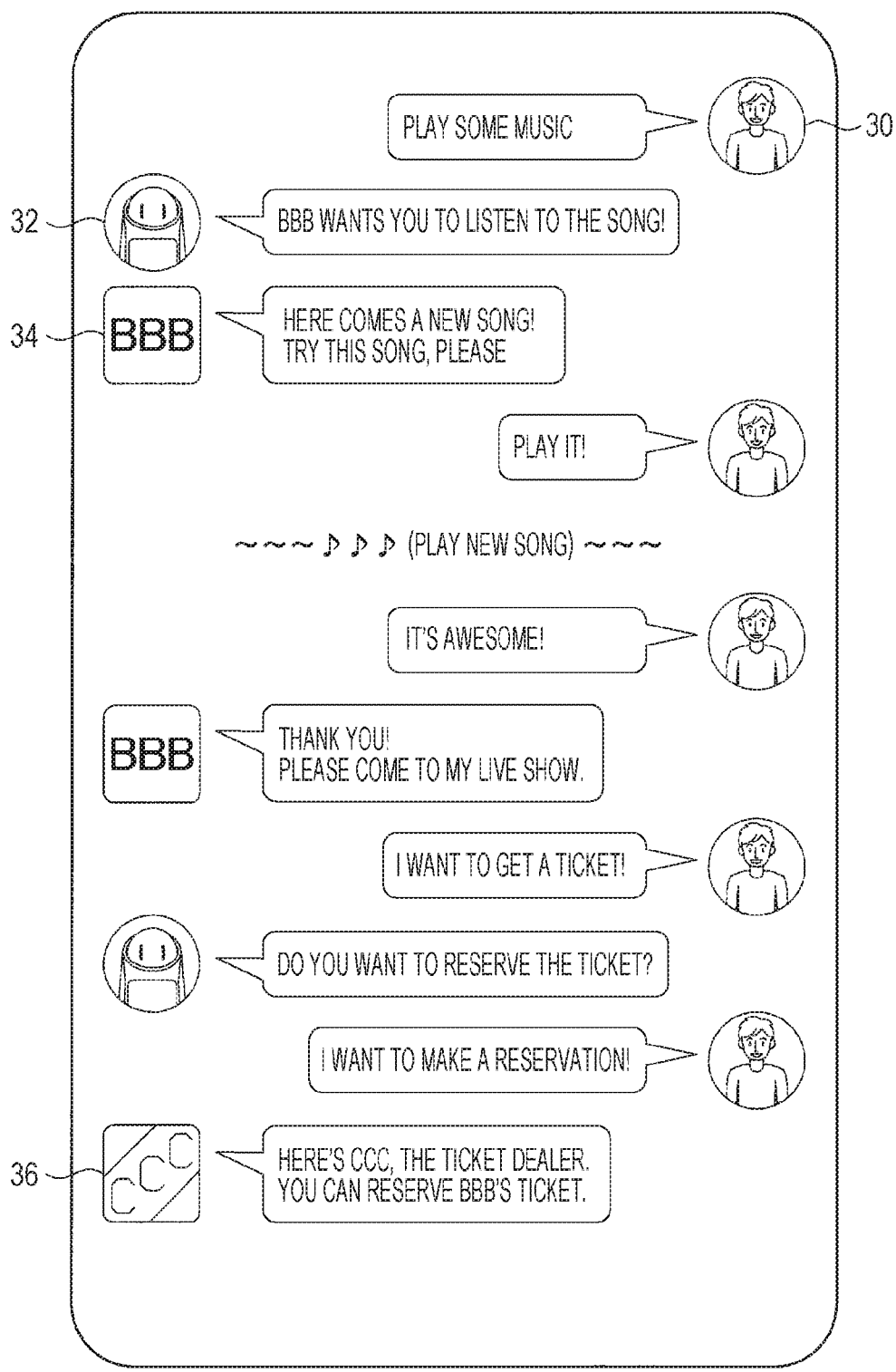
FIG. 3 is an explanatory diagram illustrating an example of a user interface of a room displayed by the notification control apparatus according to the embodiment.

FIG. 3 is a diagram illustrating an example of a screen of a room displayed by the notification control apparatus 20. The screen illustrated in FIG. 3 includes a plurality of icons and a plurality of balloons in which texts are described. On the present screen, interaction contents between the user 10 and another user 13 are arranged in time-series order from the top to the bottom. On the right side of the screen, an icon 30 corresponding to the user 10 is arranged. On the left side of the screen, an icon 32 of the notification control apparatus 20, an icon 34 of BBB who is another user 13, and an icon 36 of CCC who is another user 13 are arranged. Note that BBB is an artist. CCC is a ticket dealer. On the center of the screen, balloons having a shape in which a rectangle having rounded corners and a triangle are connected to each other are arranged, and utterance contents are described by texts in each of such balloons. An icon present in a direction pointed by a vertex of a triangle of a balloon indicates an utterer of an utterance content described in the balloon. The balloon whose vertex of the triangle points the direction of the icon is also referred to as a balloon associated with the icon. An utterance content described in the balloon associated with the icon is an utterance content of the user 10, the notification control apparatus 20, or another user 13 corresponding to the icon. Note that an arrangement of these icons and balloons is arbitrary, and is not limited to the example illustrated in FIG. 3.

The screen illustrated in FIG. 3 is generated by the communication service, and is displayed by the notification control apparatus 20 or another terminal apparatus. On the screen, messages transmitted and received between the user 10 and another user 13 in the communication service are arranged in time-series order. Moreover, on the screen, contents of a conversation performed between the user 10 and the notification control apparatus 20 are also arranged in time-series order. This conversation is a conversation performed locally without the communication service. Therefore, for example, the notification control apparatus 20 transmits contents of the locally performed conversation to the cooperation service server 11, and includes the contents of the locally performed conversation in a conversation history in the room. Therefore, the user 10 can view not only an interaction content with another user 13 but also a conversation content with the related notification control apparatus 20, on one screen.

Looking at the interaction content illustrated in FIG. 3, when the user 10 utters "play some music" to the notification control apparatus 20, the notification control apparatus 20 displays an utterance content of the user 10 in a balloon associated with the icon 30 of the user. For the utterance of the user 10, the notification control apparatus 20 displays an utterance content of the notification control apparatus 20 such as "BBB wants you to listen to the song!" in a balloon associated with the icon 32 of the notification control apparatus. Subsequently, the notification control apparatus 20 displays a message content received from a BBB artist account, such as "Here comes a new song! Try this song, please" in a balloon associated with the icon 34 of BBB. For an utterance of the BBB artist account, in a case where the user 10 utters "play it" to request the notification control apparatus 20 to play content, the notification control apparatus 20 performs processing of playing the content.

In a case where the user makes a new request during a conversation after the content is played, the notification control apparatus 20 searches for and invites another user who can answer to the new request. In FIG. 3, CCC who is the ticket dealer is invited, and the icon 36 of CCC is displayed.

After the user 10 listens to the music, for example, it is assumed that the user 10 has made a request such as, for example, "I want to buy the music", "I want to go to a live show of the artist", or the like, to the notification control apparatus 20. The notification control apparatus 20 can provide information from another user 13 related to the request of the user 10 to the user 10 even though the notification control apparatus 20 does not hold a message that can deal with the request of the user 10.

Figure 4:
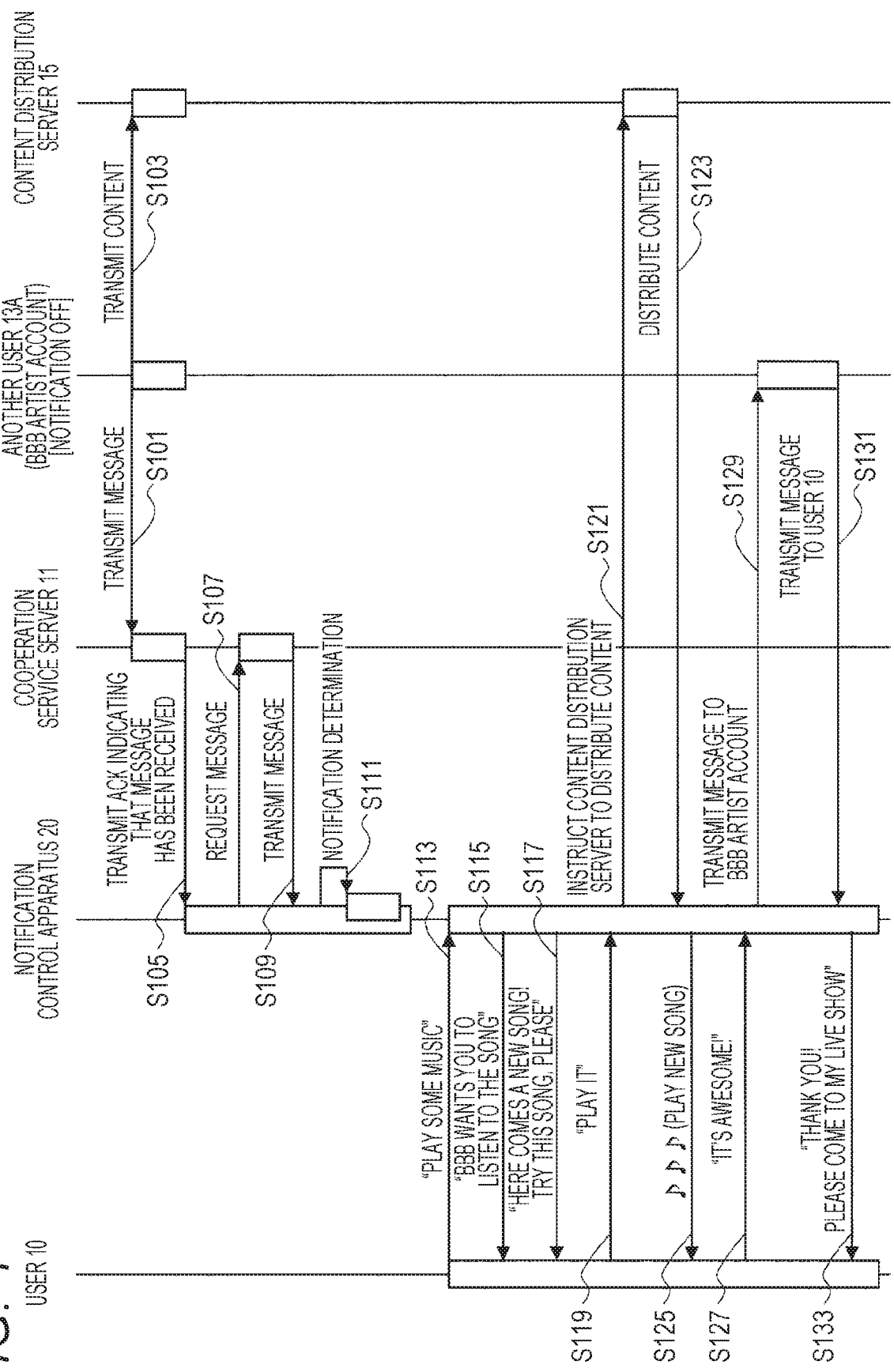
FIG. 4 is a sequence diagram illustrating an operation of the communication system when the notification control apparatus according to the embodiment notifies a user of a message for a request of the user.

FIG. 4 is a sequence diagram illustrating an operation of the communication system related to the interaction illustrated in FIG. 3. As illustrated in FIG. 4, before there is a request from the user 10 (step S113), there are steps (steps S101 to S109) in which the notification control apparatus 20 acquires a message to be notified to the user 10. First, another user 13A transmits a message "Here, comes a new song! Try this song, please" to the cooperation service server 11 (step S101). At the same time, in a case where there is content to be provided to the user 10, another user 13A transmits the content to the content distribution server 15 (step S103). Note that the user 10 is in a state where he/she sets the notification setting to OFF so as not to be notified of the message from another user 13A.

The cooperation service server 11 that has received the message from another user 13A transmits information indicating that the cooperation service server 11 has received the message to the notification control apparatus 20 (step S105). The notification control apparatus 20 that has received the information indicating that the cooperation service server 11 has received the message requests the cooperation service server 11 to transmit the message (step S107). The cooperation service server 11 that has received the message request from the notification control apparatus 20 transmits the message to the notification control apparatus 20 (step S109). The notification control apparatus 20 that has received the message makes a notification determination (step S111), notifies the user 10 of the message determined to be notified, and holds the message determined not to be notified. Note that detailed processing of the notification determination will be described later.

In the notification determination of step S111 in FIG. 4, the notification control apparatus 20 determines that the message is not notified to hold the message received in step S109. The notification control apparatus 20 holds messages that have not been notified as unopened messages.

Next, when a request such as "play some music!" is received from the user 10 (step S113), the notification control apparatus 20 analyzes and understands the request from the user 10, searches for a message related to music among the unopened messages, and notifies the user of the corresponding message. For example, the notification control apparatus 20 utters "BBB wants you to listen to the song" (step S115), and at the same time, selects a message of BBB among the unopened messages to notify the user of, for example, "Here comes a new song! Try this song, please" (step S117). When the user 10 makes an answer such as "Play it!" to the message of BBB (step S119), the notification control apparatus 20 understands that a request such as "Play music!" has been received by analyzing "Play it!". The notification control apparatus 20 that has understood the request of the user 10 instructs the content distribution server 15 in which another user 13A has arranged the content in step S103, to distribute the content (step S121). The content distribution server 15 that has received the distribution instruction of the content distributes the content (step S123). The notification control apparatus 20 outputs content of the music distributed by the content distribution server 15 using, for example, a voice output device (step S125).

When the user 10 utters an impression such as "It's awesome!" (step S127) after listening to the music, the notification control apparatus 20 transmits the impression of the user 10 to another user 13A (step S129). Another user 13A that has received the impression of the user 10 from the notification control apparatus 20 transmits a message for the impression of the user 10 to the notification control apparatus 20 (step S131). The notification control apparatus 20 that has received the message of another user 13A for the impression of the user 10 notifies the user 10 of a message such as "Thank you! Please come to my live show!" (step S133).

As such, the user 10 can have a conversation with another user 13 in a simulative manner via the notification control apparatus 20. Therefore, the user 10 can feel as if another user 13 is closer to him/her to enrich an appreciation experience of the content provided by another user 13. Furthermore, it is possible for another user 13 to collect impressions of the content.

Figure 5:
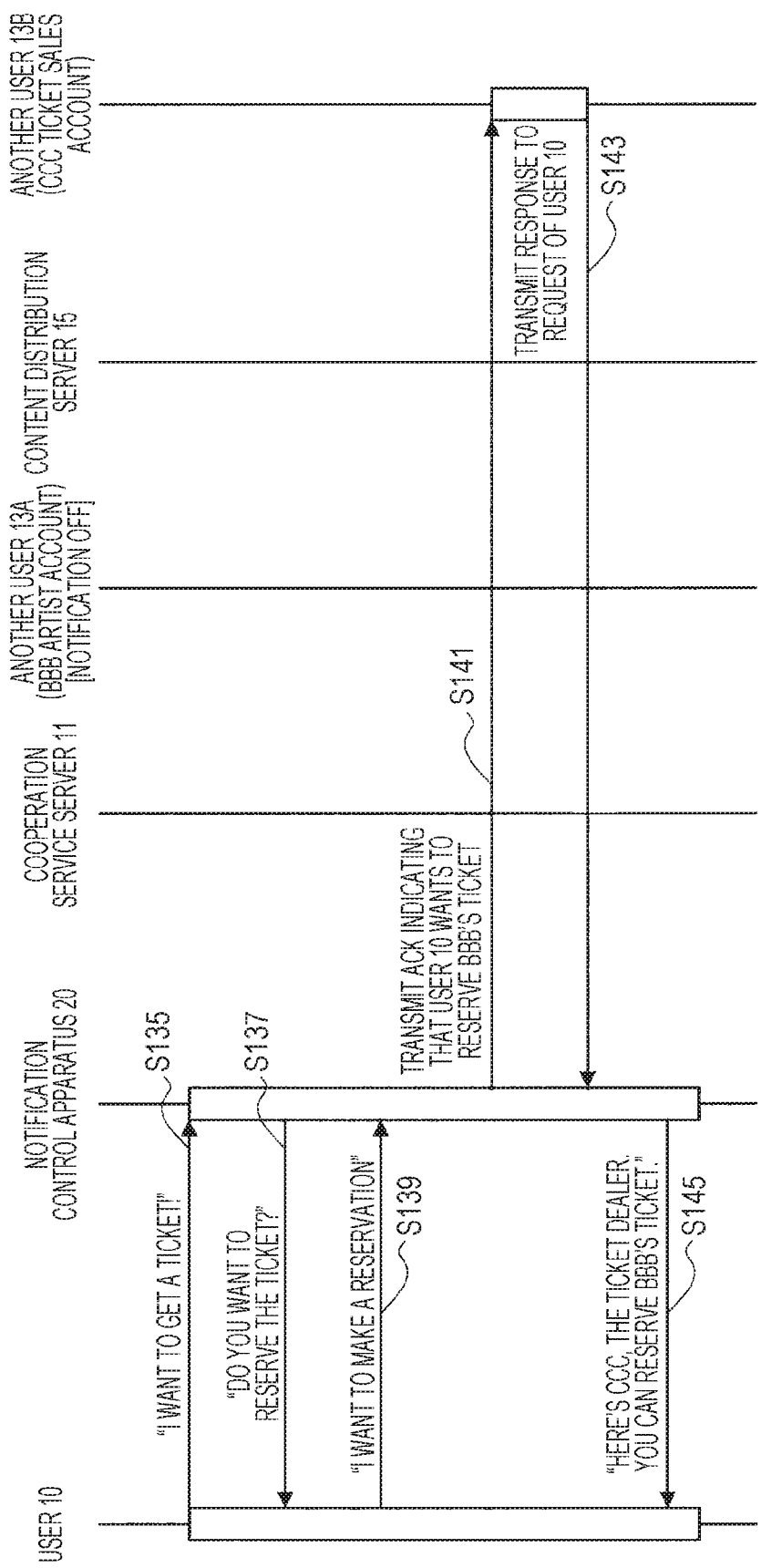
FIG. 5 is a sequence diagram illustrating an operation of the communication system when the notification control apparatus according to the embodiment obtains an answer to the request of the user, from another user who does not have information regarding a message.

FIG. 5 is an explanatory diagram illustrating an operation of the communication system in a case where the notification control apparatus 20 obtains an answer from another user 13 who does not hold a message when the notification control apparatus 20 receives another request from the user 10 after steps S113 to S133 described above. For example, when a request such as "I want to get a ticket!" is received from the user 10 (step S135), the notification control apparatus 20 understands that the notification control apparatus 20 has received a request such as "I want to reserve the ticket", and utters a content for getting a confirmation such as "Do you want to reserve the ticket?" (step S137). The user 10 makes an answer such as "I want to make a reservation!" to the confirmation of the notification control apparatus 20, to the notification control apparatus 20 (step S139). The notification control apparatus 20 that has received the request from the user 10 may receive an answer from another user 13, in a case where the notification control apparatus 20 cannot answer to the request of the user 10 using the unopened message, when answering to the request of the user 10. For example, the notification control apparatus 20 transmits information indicating that the user 10 wants to reserve a BBB's ticket to another user 13B (step S141). Another user 13B that has received the request of the user 10 transmits an answer to the request of the user 10 to the notification control apparatus 20 (step S143). The notification control apparatus 20 that has received the answer from another user 13B notifies the user 10 of an answer such as "Here CCC, the ticket dealer. You can reserve the BBB's ticket." as a message (step S145). After step S145, in a case where the user 10 has reserved the ticket, the notification control apparatus 20 may acquire a gratitude message from BBB holding the live show and notify the user 10 of the gratitude message. Note that in a case where a room for interacting with BBB and a room for reserving the ticket are different from each other, it is desirable that the gratitude message from BBB is notified in the room for interacting with BBB.

Hereinabove, the operation example of the interaction processing according to the embodiment of the present disclosure has been described with reference to FIGS. 3 to 5. Next, an operation example of account registration according to the embodiment of the present disclosure will be described.

[2.2.2. Operation Example of Account Registration]

(1) Account Registration Processing

In a typical communication service, it may be assumed that the user 10 registers an account of another user 13 in order for the user 10 to perform an interaction with another user 13. In that case, the user 10 has searched for another user 13 who is an interaction counterpart and has registered an account of another user 13 by actively operating the terminal apparatus. However, the search and the account registration accompanied by the active operation were troublesome for the user 10. Furthermore, if a search condition is not clear, it took time and labor to find another user 13 who is a target.

Therefore, the notification control apparatus 20 performs at least some of a series of account registration processing of searching for the account of another user 13 who is an interaction counterpart and registering the account, instead of the user 10, as described below. Note that searching for another user 13 may also be referred to as searching for an account.

Specifically, the notification control apparatus 20 searches for another user 13 to be permitted to transmit and receive a message to and from the user 10 among other users 13 who are not permitted to transmit and receive messages to and from the user 10 in the communication service on the basis of at least one of a request of the user 10, profile information of the user 10, or a state of the user 10 indicated by the user information. In detail, the notification control apparatus 20 creates a search condition on the basis of at least one of the request of the user 10, the profile information of the user 10, or the state of the user 10 indicated by the user information, and searches for another user 13 to be registered among other users 13 who are not registered. Here, a request of the user 10 refers to a request content when the user 10 has requested some information (for example, provision of content) from the notification control apparatus 20 during an interaction between the user 10 and the notification control apparatus 20. The request of the user 10 includes, for example, "play music", "I want to watch a movie", and the like. Furthermore, here, the profile information is, for example, personal information, a hobby, a purchase history, or the like, of the user 10. Furthermore, here, the state of the user 10 is real-time information of the user 10 acquired by a camera, a sensor, or the like included in the notification control apparatus 20. Table 3 below illustrates an example of a search condition and a search result.

TABLE 3

Example of search condition and search result of another user 13

| Search condition | | | | |
|---|---|---|---|---|
| Type of user information | Acquired information | Details of acquired information | Category to be searched | Search result of account |
| Request of user 10 | Play music I want to watch a movie | — — | Music Movie | Artist Movie theater |

TABLE 3-continued

Example of search condition and search result of another user 13

| | | Search condition | | |
|---|---|---|---|---|
| Type of user information | Acquired information | Details of acquired information | Category to be searched | Search result of account |
| Profile information of user 10 | Hobby | Cooking | Cooking | Recipe introduction |
| | Purchase history | Soccer Refrigerator, PC | Soccer Consumer electronics | Soccer team Electronics retail store |
| State of user 10 | Viewing/ listening television | — | Television | Television station |
| | Listening to music | — | Music | Artist |

As illustrated in Table 3, for example, the notification control apparatus 20 searches for an account of a nearby shop from an address of the user 10. If the hobby of the user 10 is listening to music, the notification control apparatus 20 searches for an account of an artist of music which the user 10 frequently listens to. The notification control apparatus 20 searches for an account of an electronics retail store if there is a purchase history of consumer electronics by the user 10. Furthermore, as illustrated in Table 3, for example, the notification control apparatus 20 searches for an account of a television station in a case of detecting a state where the user 10 is viewing/listening a television (TV). The notification control apparatus 20 searches for an account of an artist of music that is being played in a case of detecting a state where the user 10 is listening to the music.

Then, the notification control apparatus 20 performs a setting for permitting transmission and reception of the message between another user 13 to be permitted and the user 10. In detail, the notification control apparatus 20 registers the account of another user 13 obtained by the search described above.

As described above, the notification control apparatus 20 searches for another user 13 whose account is to be registered among other users 13 who are not registered, on the basis of the user information, and registers the account. Since the user 10 does not need to actively operate the terminal apparatus, it becomes possible to reduce labor required for the user 10 to perform the search and the registration. Furthermore, since the notification control apparatus 20 searches for another user 13 on the basis of the user information, it is possible to prevent another user 13 inappropriate as an interaction counterpart from being erroneously registered.

Hereinafter, a specific example of a flow of account registration processing will be described with reference to FIG. 6.

Figure 6:
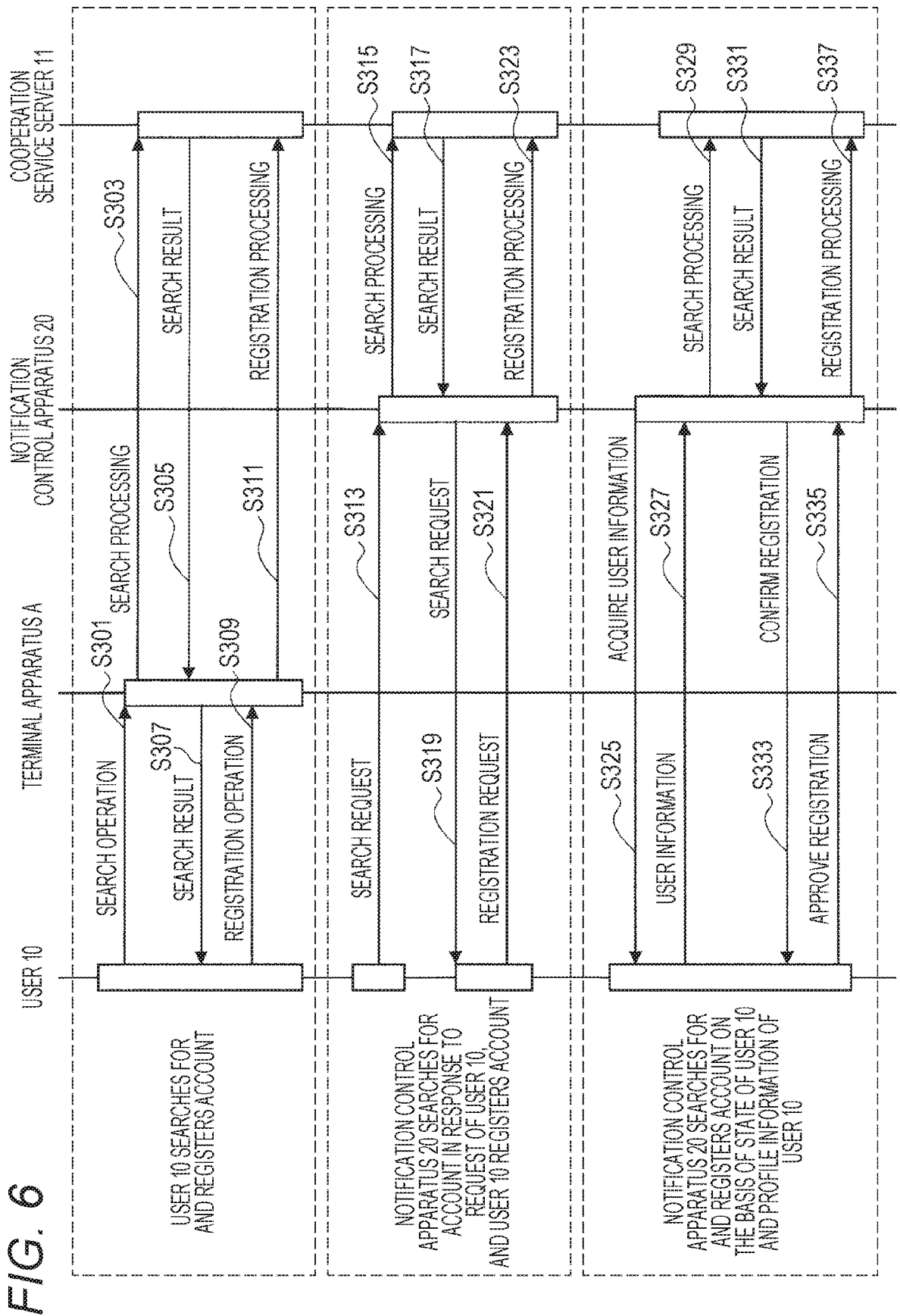
FIG. 6 is a sequence diagram illustrating account registration processing according to a comparative example and the embodiment.

FIG. 6 is a sequence diagram illustrating account registration processing according to a comparative example and the embodiment. An upper sequence of FIG. 6 illustrates account registration processing according to the comparative example. The present sequence relates to a method in which the user 10 actively operates the terminal apparatus to search for and register an account of another user 13. For example, the user 10 performs an operation of searching for an account of another user 13 using a terminal apparatus A (step S301). The terminal apparatus A instructs the cooperation service server 11 to perform search processing on the basis of the search operation of the user 10 (step S303). The cooperation service server 11 transmits a search result to the terminal apparatus A (step S305), and the terminal apparatus A outputs the search result (step S307). The user 10 selects an account of another user 13 from the output search result, and performs a registration operation on the terminal apparatus A (step S309). The terminal apparatus A instructs the cooperation service server 11 to register the account of another user 13 on the basis of the registration operation of the user 10 (step S311).

As such, in the comparative example, the user 10 has actively operated the terminal apparatus A to perform the search. Therefore, the labor described above has been required for the user 10.

Middle and lower sequences of FIG. 6 are sequences executed when the notification control apparatus 20 performs at least some of account registration processing instead of the user 10. According to these sequences, it is possible to reduce the labor that has been required for the user 10 in the comparative example.

The middle sequence of FIG. 6 relates to a method in which the notification control apparatus 20 searches for and registers an account of another user 13 according to a request of the user 10. First, the user 10 requests information from the notification control apparatus 20 (step S313). The notification control apparatus 20 that has received the request instructs the cooperation service server 11 to perform search processing for another user 13 related to the requested information (step S315). The cooperation service server 11 that has received the instruction of the search processing from the notification control apparatus 20 transmits a search result to the notification control apparatus 20 (step S317), and the notification control apparatus 20 outputs the search result (step S319). The user 10 selects an account of another user 13 from the output search result, and requests the notification control apparatus 20 to register the account (step S321). The notification control apparatus 20 that has received the request from the user 10 instructs the cooperation service server 11 to register the account of another user 13 (step S323).

The lower sequence of FIG. 6 relates to a method in which the notification control apparatus 20 searches for and registers an account of another user 13 on the basis of a state and profile information of the user 10. First, the notification control apparatus 20 acquires user information including the state of the user 10 by a camera, a sensor, and the like (step S325). The notification control apparatus 20 acquires the state of the user 10 detected in step S325 as user information (step S327). The notification control apparatus 20 instructs the cooperation service server 11 to perform search processing on the basis of the user information acquired in step S327 and the profile information (step S329). The notification control apparatus 20 receives a search result from the cooperation service server 11 (step S331). The notification control apparatus 20 selects an account of another user 13 suitable for the state and the profile information of the user 10 from the received search result, and confirms whether or not to register the selected account of another user 13 to the user 10 (step S333). When the notification control apparatus 20 receives an answer indicating approval of the registration from the user 10 (step S335), the notification control apparatus 20 instructs the cooperation service server 11 to register the account of another user 13 (step S337).

Hereinabove, the example of search and registration processing of the account has been described with reference to FIG. 6. As described above with reference to FIG. 6, the notification control apparatus 20 performs the search and registration processing of the account, such that the user 10 can obtain information from a more appropriate account without requiring the labor.

Note that there is an example other than the example described above as example in which the labor is required for the user 10, described in the example of the search and registration processing of the account. For example, it is a takeover of data at the time of updating a client application, at the time of replacing a terminal apparatus using the client application, or the like. The takeover of the data has been performed manually by the user 10 till now, such that the labor has been required for the user 10. Specifically, the user 10 has decided data to be taken over, has made a correction to the data, if necessary, and has then manually taken over the data by character input, copy and paste, or the like. Therefore, the notification control apparatus 20 performs at least some of the takeover processing described above instead the user 10. Therefore, it becomes possible to reduce the labor of the user 10. The takeover of the data is performed, for example, by designating target data to be taken over to the cooperation service server 11. Note that the data to be taken over may include a message itself or may include an analysis result of the message. As a takeover of the analysis result of the message, for example, the notification control apparatus 20 may analyze and correct a message determined to be taken over, and then take over the corrected message. Furthermore, as a takeover of the analysis result of the message, for example, the notification control apparatus 20 may also take over a trigger condition generated on the basis of the analysis result of the message.

(2) Temporary Account Registration Processing

The notification control apparatus 20 may perform a setting for temporarily permitting transmission and reception of a message between the user 10 and another user 13 whose account is not registered during a period in which the user 10 satisfies a predetermined condition. In detail, the notification control apparatus 20 performs the account registration processing described above on the basis of the user information, and registers an account of another user 13 that is not registered. The notification control apparatus 20 maintains a state where the message can be transmitted and received between the user 10 and another user 13 during the period in which the user 10 satisfies the predetermined condition. Thereafter, when the user 10 no longer satisfies the predetermined condition, the notification control apparatus 20 cancels the account registration of another user 13 to disable the transmission and the reception of the message between the user 10 and another user 13.

The predetermined condition is that the user 10 is in a predetermined state, such as a state where the user 10 tries to achieve a predetermined purpose, a state where the user 10 performs a predetermined action, a state where the user 10 is at a predetermined place, or the like. The notification control apparatus 20 registers an account of another user 13 related to a state of the user, continues the account registration during a period in which the state is continued, and cancels the account registration when the state is eliminated. For example, the notification control apparatus 20 registers an account of another user 13 (for example, an enterprise) during a period in which the user 10 is a member of a member service provided by another user 13, and cancels the account registration after the period has elapsed. For example, the notification control apparatus 20 registers accounts of a tour guide and another user 13 such as another participant and the like of a tour in which the user 10 participates during a period in which the user 10 is touring, and cancels the account registration after the period has elapsed. For example, the notification control apparatus 20 registers an account of another user 13 related to a product that the user 10 intends to purchase, and cancels the account registration after the purchase.

With such temporary account registration, the user 10 can interact with another user 13 during the period in which he/she satisfies the predetermined condition. On the other hand, after the predetermined condition is no longer satisfied because the predetermined purpose has been achieved, the predetermined action has been stopped, or the user has moved from the predetermined place, for example, the account registration is canceled. Therefore, the user 10 can prevent an unnecessary message from being received from another user 13 to and from which transmission/reception of the message has become unnecessary. This is also useful for another user 13. This is because another user 13 can exclude the user 10 to and from which transmission and reception of the message has become unnecessary from a transmission target of the message.

The notification control apparatus 20 may continue the account registration even after the user 10 no longer satisfies the predetermined condition. For example, the notification control apparatus 20 registers an account of another user 13 related to a product that the user 10 intends to purchase, and continues the account registration of another user 13 who is a manufacturer of the purchased product after the user 10 purchases the product, and cancels account registration of another user 13 of other manufacturers. Therefore, the user 10 can receive an after-sale service related to the purchased product from another user 13 whose account registration has been continued.

A room for an interaction between the user 10 and another user 13 whose account is temporarily registered is also referred to as a "temporary room". In the temporary room, an interaction between the user 10 and another user 13 whose account is temporarily registered becomes possible. Furthermore, a gathering of a user and another user who can interact with each other in the temporary room is also referred to as a "group", and one room is associated with one temporary group. The temporary room exists only during a period in which the user 10 satisfies the predetermined condition. That is, the temporary room is deleted in a case where the user 10 no longer satisfies the predetermined condition. Note that a plurality of other users 13 may be invited to the group associated with the temporary room.

The notification control apparatus 20 may copy an interaction content of another user 13 whose account registration is continued even after the user 10 no longer satisfies the predetermined condition among conversation contents included in the temporary room into an individual room with another user 13, and leave the interaction content as a history. Therefore, for example, in a case where the user 10 purchases a product of another user 13 whose account is temporarily registered, it becomes possible to browse product information and the like provided by another user 13 in the temporary room in the individual room with another user 13. Since information at the time of purchasing the product can be browsed even after purchasing the product, convenience at the time of receiving an after-sale service is improved.

The notification control apparatus 20 creates a temporary room in which another user 13 whose account is temporarily registered and the user 10 can interact with each other. For example, the notification control apparatus 20 transmits a message asking whether or not another user 13 related to the action of the user 10 can support the action of the user 10 to another user 13 related to the action of the user 10 to confirm whether or not another user 13 related to the action of the user 10 can support the action of the user 10. Next, the notification control apparatus 20 creates a temporary room in which another user 13 who has answered that he/she can support the action of the user to the confirmation is invited to a group. For example, in a case where the user 10 performs an action such as purchasing a product, the notification control apparatus 20 temporarily registers an account of another user 13 related to a product that the user 10 has used in the past from a purchase history of the user 10.

Hereinafter, temporary account registration will be specifically described with reference to FIGS. 7 and 8.

Figure 7:
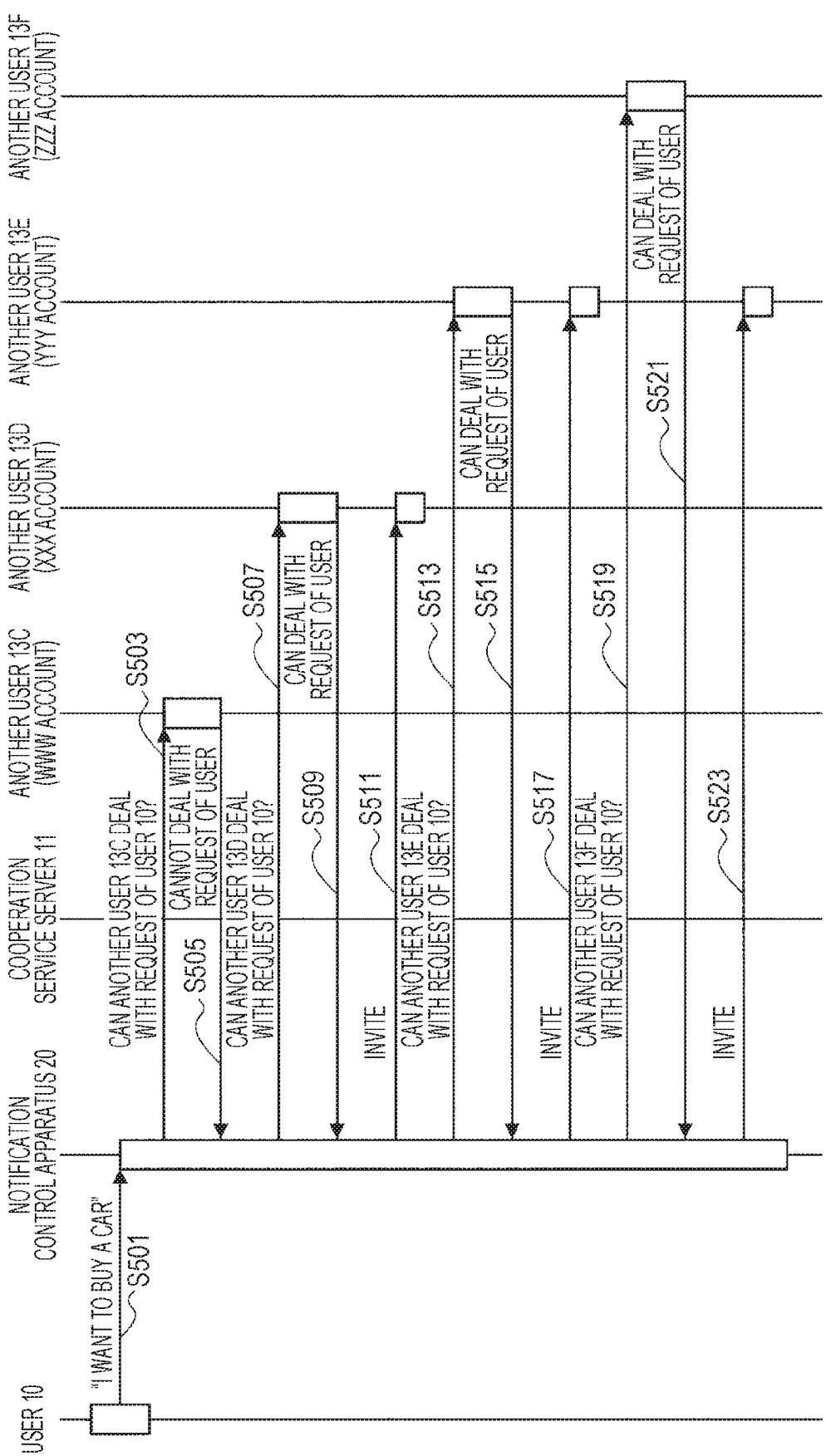
FIG. 7 is a sequence diagram illustrating an example of a flow of temporary account registration processing executed by the communication system according to the embodiment.

FIG. 7 is a sequence diagram illustrating an example of a flow of temporary account registration processing. As illustrated in FIG. 7, first, the notification control apparatus 20 receives a request such as "I want to buy a car." from the user 10 (step S501). Next, the notification control apparatus 20 searches for other users 13 related to a car, and confirms whether or not another user 13C, another user 13D, another user 13E, and another user 13F who are searched can deal with the request of the user 10 (steps S503, S507, S513, and S519). Note that another user 13C is a car company WWW, another user 13D is a car company XXX, another user 13E is a car company YYY, and another user 13F is a car company ZZZ. Next, the notification control apparatus 20 receives an answer from each account (steps S505, S509, S515, and S521). Next, the notification control apparatus 20 invites another user 13D, another user 13E, and another user 13F who have answered that they can deal with the request of the user 10, to a group associated with the temporary room (steps S511, S517, and S523).

Note that in a case where the user 10 requests the notification control apparatus 20 to invite another specific user 13 to the group, the notification control apparatus 20 may additionally invite another specific user 13 to the group. Furthermore, in a case where the user 10 requests the notification control apparatus 20 to cancel the invitation of another specific user 13 of other users 13 invited to the group associated with the temporary room to the group, the notification control apparatus 20 may cancel the account registration of another specific user 13.

Furthermore, within the group, the notification control apparatus 20 may distinguish users (the user 10 and the plurality of other users 13) from each other according to each purpose. In this case, the notification control apparatus 20 instructs the cooperation service server 11 to change a transmission and reception setting of the message in the communication service according to such a distinguishment. According to a basic transmission and reception setting in the communication service, an utterance content in the room is transmitted to all other users other than an uttering user. On the other hand, in a case where the distinguishment described above is performed, the notification control apparatus 20 sets the transmission and reception setting according to a distinguishment of the purpose so that a transmission destination of the utterance content is limited to some users included in the group.

For example, the notification control apparatus 20 may set the transmission and reception setting so as to permit transmission and reception of a message only between users having different purposes and to prohibit transmission and reception of a message between users having the same purpose. As an example, a case where the user 10 has a purpose such as "buying a car" and a room in which the plurality of other users 13 having a purpose such as "selling a car" has been invited is created is assumed. In this case, the notification control apparatus 20 distinguishes that the user 10 is a user having the purpose such as "buying a car" and the plurality of other users 13 is users having the purpose such as "selling a car". Then, the notification control apparatus 20 sets the transmission and reception setting so as to permit transmission and reception of a message between the user 10 and the plurality of other users 13 who have different purposes and prohibit transmission and reception of a message between the plurality of other users 13 who has the same purpose. With this setting, other users 13 can receive only an utterance of the user 10, so that other users 13 are thus prevented from interacting with each other. Moreover, other users 13 transmit only answers to the utterance of the user 10. Therefore, within the room, for example, it is possible to avoid performing a barren interaction between AIs of car sales companies and realize a one-to-many interaction between the user 10 who wants to buy a car and other users 13 who want to sell a car.

Furthermore, for example, the notification control apparatus 20 may exceptionally permit transmission and reception of a message satisfying a predetermined condition between the users having the same purpose while prohibiting transmission and reception of a message between the users having the same purpose. The predetermined condition is that the message is a predetermined content, that the message is an answer to the request of the user 10, or the like. As an example, a case where the user 10 has a purpose such as "buying a car" and a room in which the plurality of other users 13 having a purpose such as "selling a car" has been invited is created is assumed. In this case, the notification control apparatus 20 distinguishes that the user 10 is a user having the purpose such as "buying a car" and the plurality of other users 13 is users having the purpose such as "selling a car". Then, the notification control apparatus 20 sets the transmission and reception setting so as to prohibit transmission and reception of a message between the plurality of other users 13 having the same purpose. However, in a case where the user 10 causes the plurality of other users 13 to present prices of the car and negotiates a discount, it is desirable that the presented prices are shared between the plurality of other users 13. This is because it is expected that the present price will decrease by causing a discount competition between the plurality of other users 13. Therefore, in a case where the message includes a price of the car, the notification control apparatus 20 sets the transmission and reception setting so as to exceptionally permit the transmission and reception of the message between the plurality of other users 13 having the same purpose. Therefore, the plurality of other users 13 can mutually know the prices presented to the user 10, and a discount competition is thus caused. Furthermore, the user 10 can enjoy a benefit of a price reduction due to the discount competition.

Figure 8:
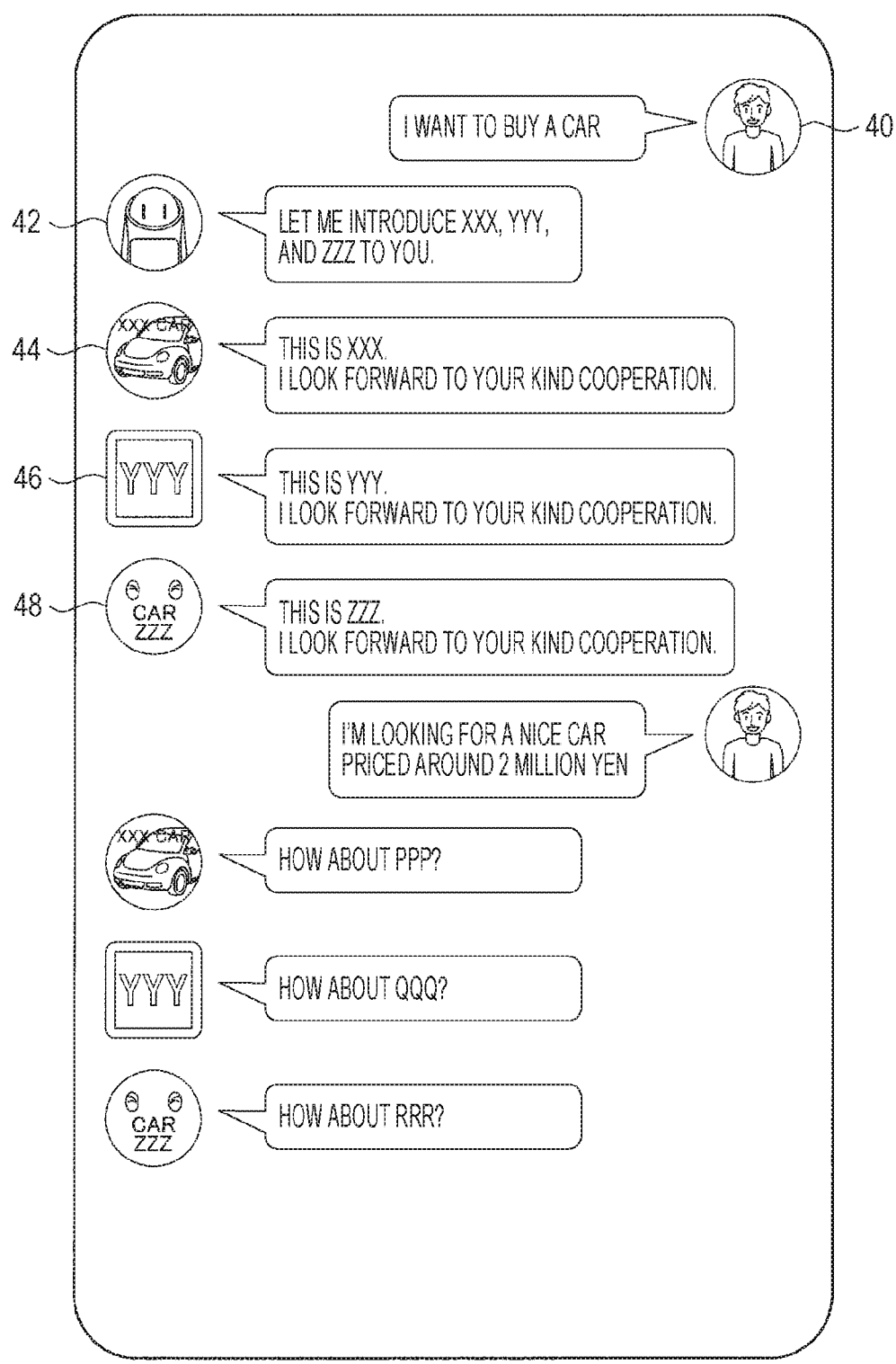
FIG. 8 is an explanatory diagram illustrating an example of a user interface of a temporary room created by the notification control apparatus according to the embodiment.

FIG. 8 is an explanatory diagram illustrating an example of a screen of a temporary room related to the temporary account registration illustrated in FIG. 7. On the screen of the temporary room illustrated in FIG. 8, interaction contents between the user 10 and other users 13 whose accounts are temporarily registered are arranged in time-series order from the top to the bottom. On the right side of the screen, an icon 40 corresponding to the user 10 is arranged. On the left side of the screen, an icon 42 of the notification control apparatus 20, an icon 44 of XXX, an icon 46 of YYY, and an icon 48 of ZZZ are arranged. On the center of the screen, balloons having a shape in which a rectangle having rounded corners and a triangle are connected to each other are arranged, and utterance contents are described by texts in each of such balloons. An icon present in a direction pointed by a vertex of a triangle of a balloon indicates an utterer of an utterance content described in the balloon. Note that an arrangement of each of these icons and balloons is arbitrary, and is not limited to the example illustrated in FIG. 8.

When the user 10 utters "I want to buy a car", the notification control apparatus 20 performs temporary account registration on the basis of such an utterance, and creates a temporary room in which XXX, YYY, and ZZZ have been invited to a group. A screen of the temporary room is a screen illustrated in FIG. 8. As illustrated in FIG. 8, after the user 10 utters "I want to buy a car", the notification control apparatus 20 utters "Let me introduce XXX, YYY, and ZZZ". Thereafter, XXX utters "This is XXX. I look forward to your kind cooperation", YYY utters "This is YYY. I look forward to your kind cooperation", and ZZZ utters "This is ZZZ. I look forward to your kind cooperation". Thereafter, when the user 10 utters "I'm looking for a nice car priced around 2 million yen", each car company introduces cars corresponding to the request of the user 10. In detail, XXX utters "How about PPP?", YYY utters "How about QQQ?", and ZZZ utters "How about RRR?". Note that the utterance of the user 10, such as "I'm looking for a nice car priced around 2 million yen", is a message (second message) transmitted from the user 10 to other users 13.

Furthermore, the notification control apparatus 20 may control notification processing to organize a plurality of answers in one table (second notification information) and notify the user 10 of the table, when answers have been received from the plurality of other users 13, in one temporary room. For example, when there were answers from each of XXX, YYY, and ZZZ as illustrated in an answer group 50 from each car company in a screen example on the left side of FIG. 9, the notification control apparatus creates a table in which an answer of one car company is organized in one column, as illustrated in an answer table 52 in a screen example on the right side of FIG. 9. Therefore, the user 10 can easily compare products of each company with each other. Note that in a case where original answers were only texts, the notification control apparatus 20 may search for and acquire images of each product and display the images in the table. Furthermore, when the answers are organized and displayed in the table, the notification control apparatus 20 may complementarily display missing information. Moreover, the notification control apparatus 20 may control the notification processing so as to notify the user 10 of a summarized message (second notification information) generated by summarizing the answers from each company. For example, the notification control apparatus 20 may summarize the answers from each company illustrated in the screen example on the left side of FIG. 9 as "XXX recommends PPP, YYY recommends QQQ, and ZZZ recommends RRR" and provide the summarized answer.

In a case where the user 10 no longer satisfies the predetermined condition, the temporary room is automatically deleted by the notification control apparatus 20, such that the account registration of other users 13 is also canceled. However, even after the user 10 no longer satisfies the predetermined condition, there is a possibility that the user 10 will need to interact with other users 13, for example, in order to receive the after-sales service after purchasing the product. At that time, when the interaction content in the temporary room is not left as a history, there is a possibility that the user 10 will not smoothly advance an interaction with other users 13. Therefore, the notification control apparatus 20 may divide the interaction content in the temporary room into contents for every other user 13 and create individual rooms for other users 13 to leave histories.

Furthermore, in a case where the user has already individually interacted with other users 13, that is, in a case where individual rooms have already been created, the interaction in the temporary room may be reflected in existing individual rooms.

As described above, the notification control apparatus 20 supports the account registration process, such that a burden on the user 10 can be reduced, and more appropriate information can be provided to the user 10. Furthermore, the notification control apparatus 20 invites a plurality of accounts to one group to make the user 10 possible to interact with the plurality of other users 13 at the same time, such that the user can simultaneously acquire, compare, and select a plurality of information. Therefore, the user 10 can efficiently collect necessary information. Moreover, the notification control apparatus 20 displays the answers of the plurality of other users 13 in the table and summarizes and displays the answers, such that it is possible to improve visibility of the interaction content.

Hereinabove, the operation example of the account registration according to the embodiment of the present disclosure has been described with reference to FIGS. 7 to 9. Next, an operation example of notification determination processing according to the embodiment of the present disclosure will be described.

[2.2.3. Operation Example of Notification Determination Processing]

The notification control apparatus 20 determines whether or not to notify the user 10 of a message received from another user 13 on the basis of a content of the message and the user information of the user 10. In the notification determination processing, when the notification control apparatus 20 receives information indicating that a message has been transmitted from another user 13 to the user 10, from the cooperation service server 11, the notification control apparatus 20 transmits the message transmitted by another user 13 from the cooperation service server 11. The notification control apparatus 20 performs the notification determination processing on the basis of the acquired message and the user information. The notification control apparatus 20 notifies the user 10 of the message in a case where the notification control apparatus 20 determines to notify the user of the message in the notification determination processing. In a case where the notification control apparatus 20 determines not to notify the user of the message, the notification control apparatus 20 does not notify the user 10 of the message, and holds the message as an unopened message.

The notification control apparatus 20 selects a message suitable for an utterance content of the user 10 and performs prioritization of a notification by analyzing, for example, the utterance content of the user 10 when selecting a message to be notified to the user 10 from the unopened message. For example, when the user 10 makes an utterance such as "I'm going to eat." or "I'm going to buy clothes." and the like, a content implying a behavior that can use a coupon is included in the utterance of the user 10, and the notification control apparatus 20 thus selects a message including coupon information. In addition, for example, if the user 10 utters "Is there any interesting movie?", the notification control apparatus 20 selects a message including a movie guidance information, and if the user 10 utters "Play music", the notification control apparatus 20 selects a message including information regarding a music content.

In a case where there is a plurality of messages that can be notified to the user 10 based on the utterance content of the user 10, the notification control apparatus 20 may prioritize and select a message. For example, in a case where there is a plurality of messages including coupon information, the notification control apparatus 20 preferentially notifies the user of a message with a close coupon expiration period. Furthermore, for example, in a case where there is a plurality of messages including information regarding content, the notification control apparatus 20 preferentially notifies the user of a message close to a taste of the user 10, In the notification determination processing, the determining unit 246 determines whether or not the notification control apparatus 20 notifies the user of the message by a plurality of determination conditions. Examples of the determination conditions include first to third determination conditions below.

In the first determination condition, the determining unit 246 makes a notification determination according to whether the notification setting is ON or OFF. In a case where the notification setting is ON, the determining unit 246 determines to notify the user 10 of the message. In a case where the notification setting is OFF, the determining unit 246 makes a notification determination according to the second determination condition.

In the second determination condition, the determining unit 246 makes a notification determination according to whether the message is addressed to the user 10 (addressed to one person) or is addressed to a plurality of persons including the user 10. In a case where the message is addressed to the user 10 (addressed to one person), the determining unit 246 determines to notify the user 10 of the message. In a case where the message is addressed to the plurality of persons including the user 10, the determining unit 246 makes a notification determination according to the third determination condition.

In the third determination condition, a notification determination is made according to whether or not the user information acquired from the user information acquiring unit 244 satisfies the trigger condition. In a case where the user information satisfies the trigger condition, the determining unit 246 determines to notify the user 10 of the message. In a case where the user information does not satisfy the trigger condition, the determining unit 246 determines not to notify the user 10 of the message.

Here, a trigger refers to processing executed by a certain trigger, and the trigger condition refers to a condition for executing processing set as the trigger. Here, the trigger is processing of notifying the user 10 of the message, and the trigger condition is a condition to be satisfied by the user information acquired by the user information acquiring unit 244. The determining unit 246 creates a trigger condition for notifying the user of the message for the message determined not to be notified in the first determination condition and the second determination condition described above. At that time, the determining unit 246 analyzes a content of the message or analyzes information regarding another user 13 who is a transmission source, and creates the trigger condition on the basis of an analysis result. Table 4 below illustrates a specific example of the trigger condition.

TABLE 4

| | | Example of trigger condition |
|---|---|---|
| Account | Message content | Trigger condition |
| Curry restaurant | Introduction of new curry | Interaction including word "curry" Curry is cooked |
| Television station | Broadcasting schedule information of program | Interaction including word "television" Turn on television |
| Restaurant | Gratitude for use | Interaction including word "restaurant" At the time of returning home from restaurant |

As illustrated in Table 4, for example, the determining unit 246 generates a trigger condition on the basis of a word best representing a characteristic of an account that is a transmission source or a characteristic word extracted from a message content. Thereafter, in a case where the trigger condition is included in an utterance content of the user 10 during an interaction between the notification control apparatus 20 and the user 10, the determining unit 246 determines to notify the user of the message. For example, in a case where there is an introduction related to an introduction of a new curry from an account of a curry restaurant, the determining unit 246 generates an interaction including a word "curry" as the trigger condition. Thereafter, it is assumed that in an interaction between the notification control apparatus 20 and the user 10, the user 10 has uttered "I want to eat curry". In that case, since "curry", which is the trigger condition, is included in the utterance of the user 10, the determining unit 246 determines to notify the user of the message, such that the notification control apparatus 20 notifies the user 10 of the message.

Furthermore, the determining unit 246 may generate a trigger condition associated with an action of the user 10 from the message content. For example, in a case where the notification control apparatus 20 receives a message related to broadcast schedule information of a program from an account of a television station, the determining unit 246 generates an action such as "turning on a television" as the trigger condition. Thereafter, when it is detected by the camera, the sensor, and the like that the user 10 has turned on the television, the determining unit 246 determines to notify the user of the message. Furthermore, for example, in a case where the notification control apparatus 20 receives a gratitude message for use of a restaurant by the user 10 from an account of the restaurant, the determining unit 246 generates the fact that the user 10 has returned home as the trigger condition. Thereafter, when it is detected by a global positioning system (GPS) and the like that the user 10 has returned home, the determining unit 246 determines to notify the user of the message.

Figure 10:
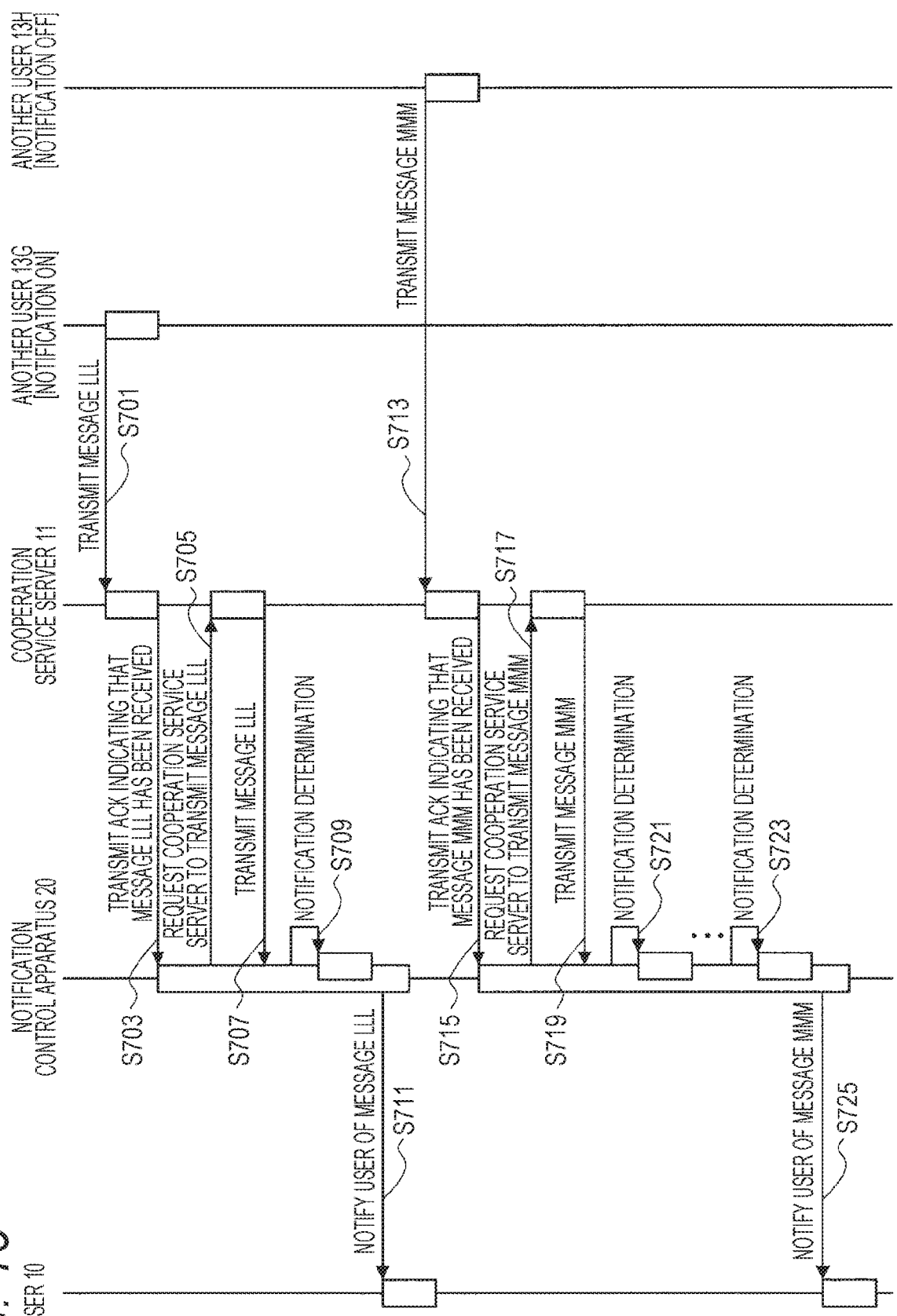
FIG. 10 is a sequence diagram illustrating an operation of the communication system when the notification control apparatus according to the embodiment notifies the user of a message according to a priority.

FIG. 10 is a sequence diagram illustrating an operation of the communication system when the notification control apparatus 20 according to the embodiment notifies the user of a message according to a notification setting. Note that in FIG. 10, it is assumed that the user 10 sets a notification setting of another user 13G to ON and sets a notification setting of another user 13H to OFF. Furthermore, FIG. 10 is a diagram for describing notification determination processing, and a description of transmission and reception and output of content will thus be omitted.

First, when another user 13G transmits a message LLL to the user 10, in processing, the message LLL is transmitted to the cooperation service server 11 (step S701), and the cooperation service server 11 that has received the message LLL from another user 13G transmits information indicating that the cooperation service server 11 has received the message LLL to the notification control apparatus 20 (step S703). The notification control apparatus 20 that has received the information indicating that the cooperation service server 11 has received the message LLL requests the cooperation service server 11 to transmit the message LLL (step S705). The cooperation service server 11 that has received the message request from the notification control apparatus 20 transmits the message LLL to the notification control apparatus 20 (step S707). The notification control apparatus 20 that has received the message LLL makes a notification determination (step S709). Since the notification setting of another user 13G is ON, the notification control apparatus 20 determines to notify the user of the message LLL on the basis of the first determination condition described above, and notifies the user 10 of the message LLL (step S711).

Next, in a case where another user 13H transmits a message MMM to the cooperation service server 11 (step S713), the cooperation service server 11 that has received the message MMM from another user 13H transmits information indicating that the cooperation service server 11 has received the message MMM to the notification control apparatus 20 (step S715). The notification control apparatus 20 that has received the information indicating that the cooperation service server 11 has received the message MMM requests the cooperation service server 11 to transmit the message MMM (step S717). The cooperation service server 11 that has received the message request from the notification control apparatus 20 transmits the message MMM to the notification control apparatus 20 (step S719). When the notification control apparatus 20 receives the message MMM, the determining unit 246 makes a notification determination (step S721). Since the notification setting of another user 13H is OFF, the determining unit 246 determines not to notify the user 10 of the message MMM on the basis of the first determination condition described above. In the notification determination processing based on the second or third determination condition described above, in a case where the determining unit 246 determines to notify the user 10 of the message MMM (step S723), the notification control apparatus 20 notifies the user 10 of the message MMM (step S725).

Figure 11:
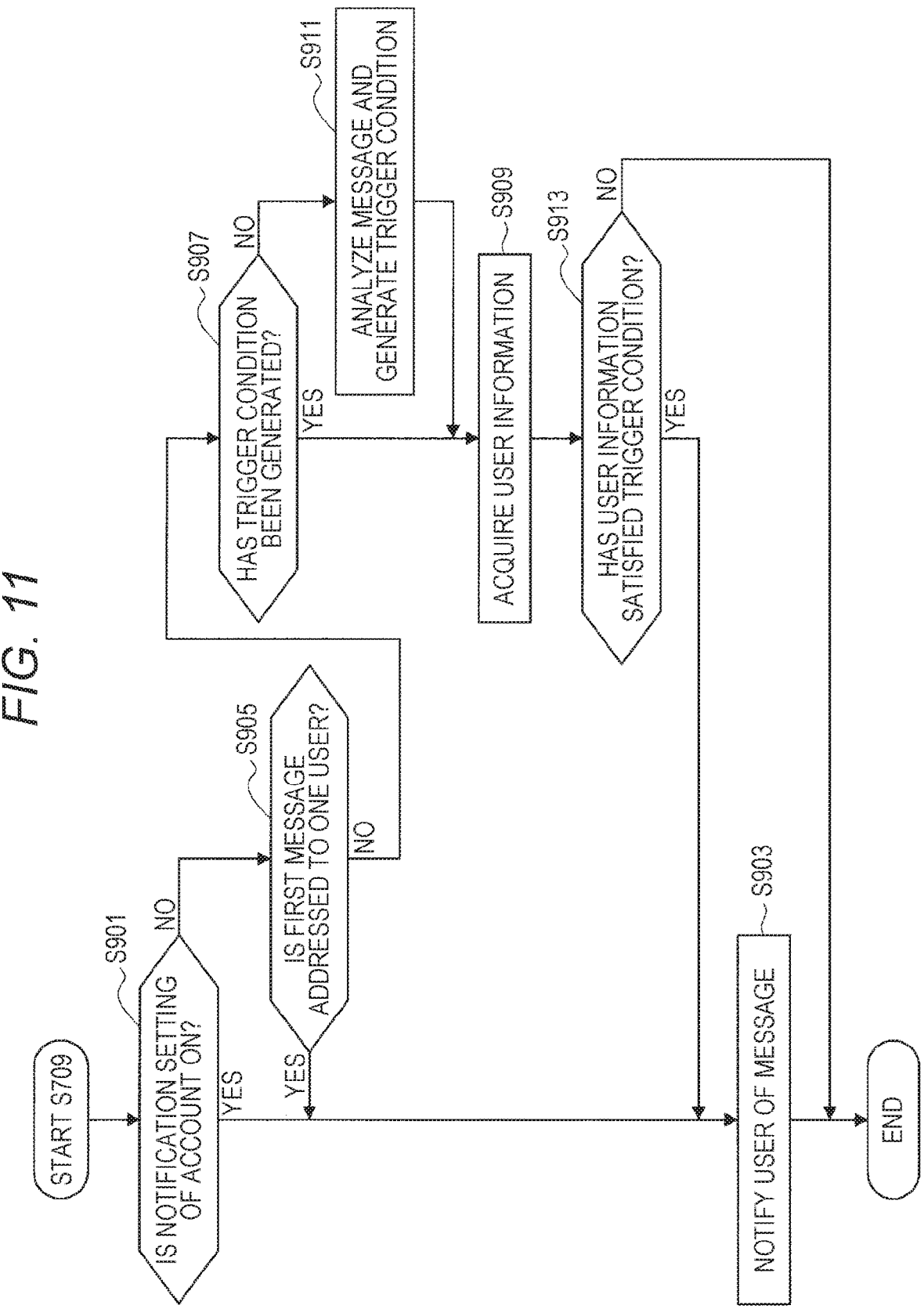
FIG. 11 is a flowchart illustrating notification determination processing performed by a determining unit according to the embodiment.

Here, detailed processing of the notification determination in steps S709, S721, and S723 will be described with reference to FIG. 11. In the notification determination processing, first, the determining unit 246 confirms whether or not a notification setting of an account is ON (step S901). In a case where the notification setting of the account is ON, the determining unit 246 determines to notify the user 10 of the message (step S903), and ends step S709.

In a case where the notification setting of the account is OFF in step S901, the determining unit 246 confirms whether or not the message is addressed to the user 10 (addressed to one person) (step S905). In a case where the message is addressed to the user 10 (addressed to one person), the determining unit 246 determines to notify the user 10 of the message (step S903), and ends step S709.

In a case where the message is addressed to a plurality of persons including the user 10 in step S905, the determining unit 246 confirms whether or not a trigger condition of a message of a notification determination target has been generated (step S907). In a case where the trigger condition has been generated in step S907, the user information acquiring unit 244 acquires user information (step S909).

In a case where the trigger condition has not been generated in step S907, the determining unit 246 analyzes the message of the notification determination target and generates a trigger condition that becomes a trigger at the time of notifying the user of the message (step S911), and the user information acquiring unit 244 acquires the user information (step S909).

After the user information is acquired in step S909, the determining unit 246 confirms whether or not the user information satisfies the trigger condition (step S913). In a case where the user information satisfies the trigger condition in step S913, the determining unit 246 determines to notify the user 10 of the message (step S903), and ends step S709. In a case where the user information does not satisfy the trigger condition in step S913, the determining unit 246 determines not to notify the user 10 of the message, and ends step S709.

Note that the embodiment in which the notification control apparatus 20 generates the trigger condition has been described in the above description, but the trigger condition may be generated by an apparatus such as a server and the like other than the notification control apparatus 20. Here, the server refers to a server connected to the notification control apparatus 20 via a network, and corresponds to, for example, the cooperation service server 11, the content distribution server 15, or the like. Furthermore, the generated trigger condition may be updated at an arbitrary timing by the notification control apparatus 20, the server, or the like. For example, after the notification control apparatus 20 generates the trigger condition, the server may dynamically update the existing trigger condition generated by the notification control apparatus 20. In a case where the trigger condition is dynamically updated by the server, the determining unit 246 may make a notification determination so as to notify the user 10 of a message satisfying the updated trigger condition.

Hereinabove, the notification timing of the message has been described. Next, how to notify a user of a message will be described.

The determining unit 246 may also determine that there is a plurality of messages that can be notified to the user 10 by the notification determination. In that case, the notification control unit 248 may control the notification processing so as to organize messages having commonality in one message and notify the user of the one message. For example, in a case where the message acquiring unit 242 acquires a plurality of similar messages from a certain account, the notification control unit 248 controls the notification processing so as to organize the plurality of messages in one message and notify the user of the one message. Furthermore, for example, also in a case where the message acquiring unit 242 acquires messages related to playing of music from an account XXX and an account YYY, the notification control unit 248 may control the notification processing so as to organize the messages in one message such as "Here is music introduced by XXX and YYY, do you want to play it?" and notify the user of the one message. Note that in a case where the user 10 answers that he/she wants to play the content to a question asking whether or not to play the content described above, the notification control unit 248 may control the processing so as to continuously play a song of XXX and a song of YYY.

The notification control unit 248 may organize a plurality of messages in one message by summarizing the plurality of messages or connecting the plurality of messages to each other as they are. The connection order is typically the order of reception time. For example, in a case where the music is continuously played as in the messages related to the playing of the music described above, the notification control apparatus 20 plays each music in time-series order of reception. The notification control unit 248 may organize a plurality of messages having a common category in one message. For example, the notification control unit 248 generates messages related to a movie that are organized in one message, in addition to the messages related to the music that are organized in the one message described above. In this case, in the same category, a connection order of the messages is the order of the reception time. Meanwhile, for the plurality of messages (for example, the messages related to music and the messages related to the movie) having different categories and organized in the one messages, the notification order is arbitrary.

In a case where there was a reply from another user 13 to a message transmitted to another user 13 by the user 10, the notification control apparatus 20 notifies the reply of the user 10. For example, the determining unit 246 determines whether or not a message (first message) addressed from another user 13 to the user 10 is a reply to a message (second message) transmitted from the user 10 to another user 13. In a case where the determining unit 246 determines that the first message is the reply to the second message, the determining unit 246 notifies the user 10 of the first message. Depending on a content of the message transmitted by the user 10, it may take time for another user 13 to prepare an answer. The notification control apparatus 20 notifies the user 10 of a reply message in a case where the notification control apparatus 20 receives the reply message from another user 13 even though it took time for another user 13 to prepare the reply message.

For example, in a case where another user 13 is an enterprise, it is assumed that an utterance of another user 13 is basically performed by an AI. However, there is a possibility that the AI cannot answer to a complex question from the user 10. In that case, the utterance of another user 13 can be performed by a person instead of the AI. It is considered that it takes time to change an utterer as such. In this regard, the notification control apparatus 20 notifies the user 10 of the utterance performed by the person if the utterance performed by the person is an answer to the message from the user 10. Therefore, the notification control apparatus 20 can certainly notify the user 10 of a message from a person who is likely to accurately answer to a question of the user 10 even though it took time.

In a case of outputting a message to be notified to the user 10, for example, the notification control apparatus 20 reads a content of the message, and outputs the content using a voice output device. Furthermore, in a case of outputting the content, for example, music is output and played by a voice output device, and content including a moving image is output to and played on a display.

Hereinabove, the operation example of the notification determination processing according to the embodiment of the present disclosure has been described with reference to FIGS. 10 and 11. Next, an operation example after notification according to the embodiment of the present disclosure will be described.

[2.2.4. Operation Example after Notification]

The notification control apparatus 20 can further improve convenience of the user by not only notifying the user 10 of the message, but also performing an operation of supporting an action of the user after the message notification. A specific example will be described below.

At the time of notifying the user 10 of the message in steps S711 and S725 of FIG. 10, the notification control unit 248 considers a content of the message, and then controls how to notify the user of the message. For example, if the content of the message is only a text, the text is notified with reading by a voice. However, in a case where the content or URL information indicating an arrangement location of the content is included in the message, even though the URL information is read by a voice as it is, a specific content indicated by the URL information cannot be transmitted to the user 10. Therefore, the notification control unit 248 creates a message (first notification information) asking the user 10 whether or not to output the content on the basis of the message including the content or the URL information indicating the arrangement location of the content, and notifies user 10 of the message (first notification information). An example of creating a message asking the user whether or not to output the content is illustrated in Table 5 below.

TABLE 5

Example of creating message asking whether or not to output, content

| Content | Message representation | Processing |
| --- | --- | --- |
| Music | Here is music introduced by III. Do you want to play it? | Play music |
| Moving image | Here is a moving image guided by JJJ. Do you want to play it? | Play moving picture |
| Coupon | Here is a coupon provided from KKK. Do you want to transfer it? | Transfer coupon |

As illustrated in Table 5, in a case where content of music is included in the message, the notification control unit 248 creates a message in a question format such as "Here is music introduced by III, do you want to play it?". In a case where the user 10 answers that he/she wants to play the music to the question, the notification control unit 248 understands that the notification control unit 248 has received an instruction to play the music, and plays the music with reference to a URL described in the message. The same applies to a moving image. Furthermore, for example, in a case of content related to a coupon in which the user 10 receives a service by presenting a coupon displayed on a mobile terminal and the like at a store, processing is processing of transferring the coupon to a mobile terminal used when the user 10 presents the coupon at the store.

Furthermore, in a case where a plurality of coupons capable of achieving a purpose of the user 10 has been received, the notification control apparatus 20 may transfer the coupons to the user 10 in consideration of a priority of a notification to the user 10. A factor that determines the priority includes, for example, the order of stores to which the user 10 frequently goes, the order of discount rates of the coupons, and the order of distances from the user 10 to stores, and the like. Moreover, when a store to which the user 10 goes is determined, the notification control apparatus 20 may additionally transfer information, coupons, and the like of the neighboring stores to the user 10.

Figure 12:
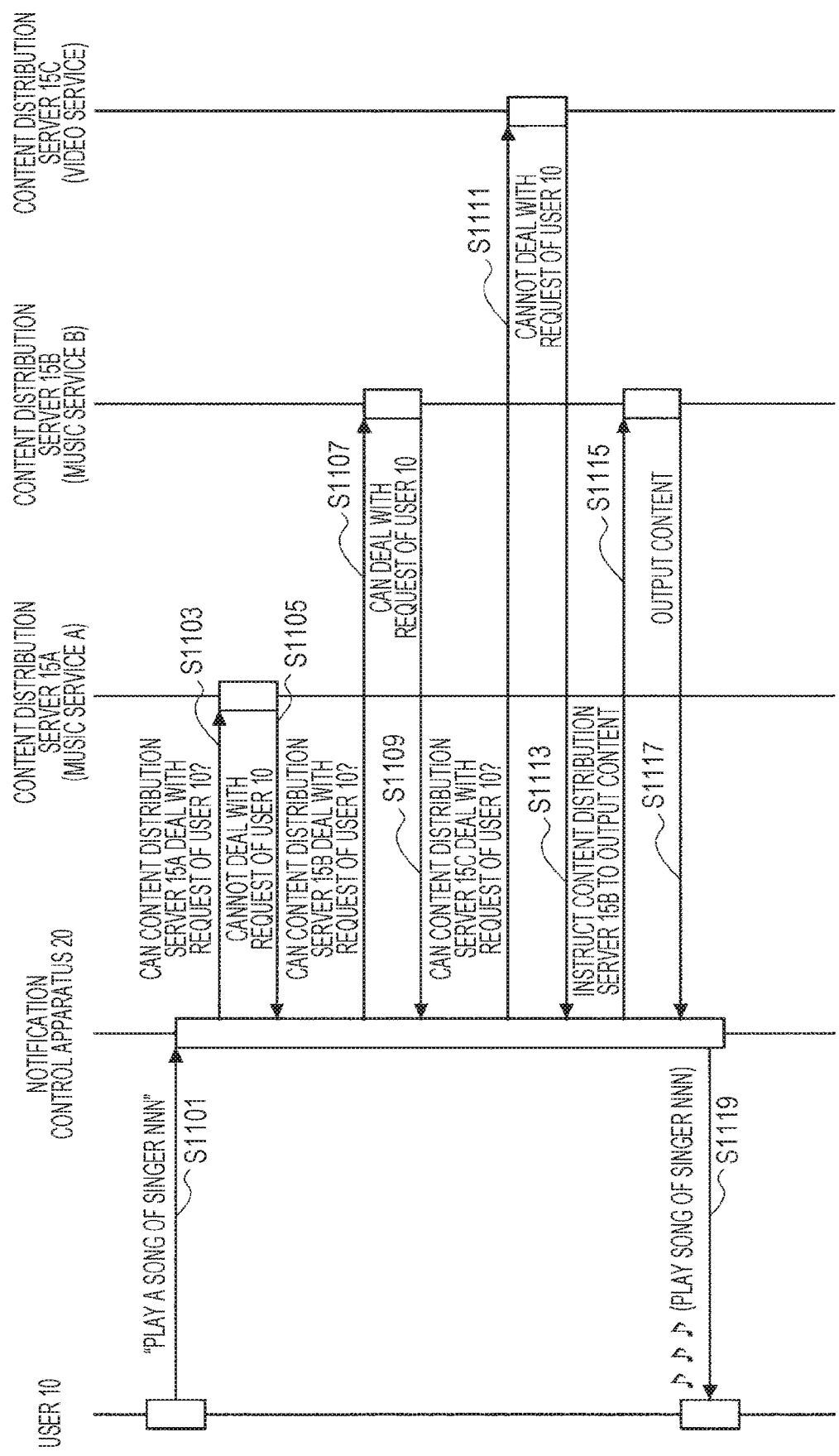
FIG. 12 is a sequence diagram illustrating an operation of the communication system when the notification control apparatus according to the embodiment selects a service that outputs content.

FIG. 12 is a sequence diagram illustrating processing of selecting a service satisfying a request of the user 10 among a plurality of services in a case where the request from the user 10 received by the notification control apparatus 20 was a request related to processing of content. The notification control apparatus 20 does not always deal with the request of the user 10 with the same service, but can select and provide an appropriate service that can deal with the request of the user 10 among the plurality of services.

The notification control apparatus 20 searches for services that can deal with the request of the user 10, confirms whether or not the searched services can deal with the request of the user 10, acquires content from a service that has answered that the service can deal with the request of the user 10, and provides the acquired content to the user 10.

In FIG. 12, first, when the notification control apparatus 20 receives a request such as "Play a song of a singer NNN" from the user 10 (step S1101), the notification control apparatus 20 confirms whether, for example, a content distribution server 15A that provides a music service A, a content distribution server 15B that provides a music service B, and a content distribution server 15C that provides a music service C among a plurality of content distribution servers 15 can deal with the request of the user 10 (steps S1103, S1107, and S1111). The notification control apparatus 20 receives answers from each cooperation service server 11 (steps 1105, 1109, and 1113), and instructs the content distribution server 15B that has answered that the content distribution server 15B can deal with the request of the user 10 to output content (step S1115). The content distribution server 15B that has received the output instruction of the content outputs the content (step S1117), and the notification control apparatus 20 plays the song of the singer NNN using, for example, a voice output device (step S1119). Note that in FIG. 12, only one content distribution server 15B has answered that it can deal with the request of the user 10. In a case where there is a plurality of content distribution servers that has answered that they can deal with the request of the user 10, the notification control apparatus 20 may cause the user 10 to select a distribution source.

Depending on a content of the notified message and a timing of the notification, it may be desirable to notify the user 10 of the message once, and then notify the user 10 of the message again. For example, assume that when the user 10 is at home, the user 10 talks to the notification control apparatus 20 with "I'm going for shopping. Do you have a coupon?", and the notification control apparatus 20 displays a coupon of a certain store. However, since the user actually uses the coupon when the user 10 is at the store, there is no point in displaying the coupon when the user 10 is at home, and it is desirable to notify the user 10 of a message for the coupon again when the user 10 is at the store.

Furthermore, the user 10 can think that he/she wants to receive the notification again at the time of returning home or think that he/she wants to receive the notification again by a device at home, when he/she receives the notification again while being out. Therefore, the notification control apparatus 20 may control notification processing so as to notify the user of the message once notified to the user again according to the request of the user 10.

Furthermore, in a case where the user 10 is at home, it is conceivable that the notification control apparatus 20 notifies both of a home terminal placed at home and a mobile terminal carried by the user 10, of the message. Since there is also a user 10 who does not want to be notified twice in the home terminal and the mobile terminal, in that case, the notification control apparatus 20 may control the notification processing so as to notify one of the terminals of the message.

Hereinabove, the operation example after notification according to the embodiment of the present disclosure has been described with reference to FIGS. 10 to 12.

3. Hardware Configuration

The embodiment and the modified example of the present disclosure have been described hereinabove. The information processing such as the acquisition of the user information and the message, the notification determination, the control of the notification processing, and the like, described above, is realized by cooperation between software and hardware of the notification control apparatus 20 described below.

Figure 13:
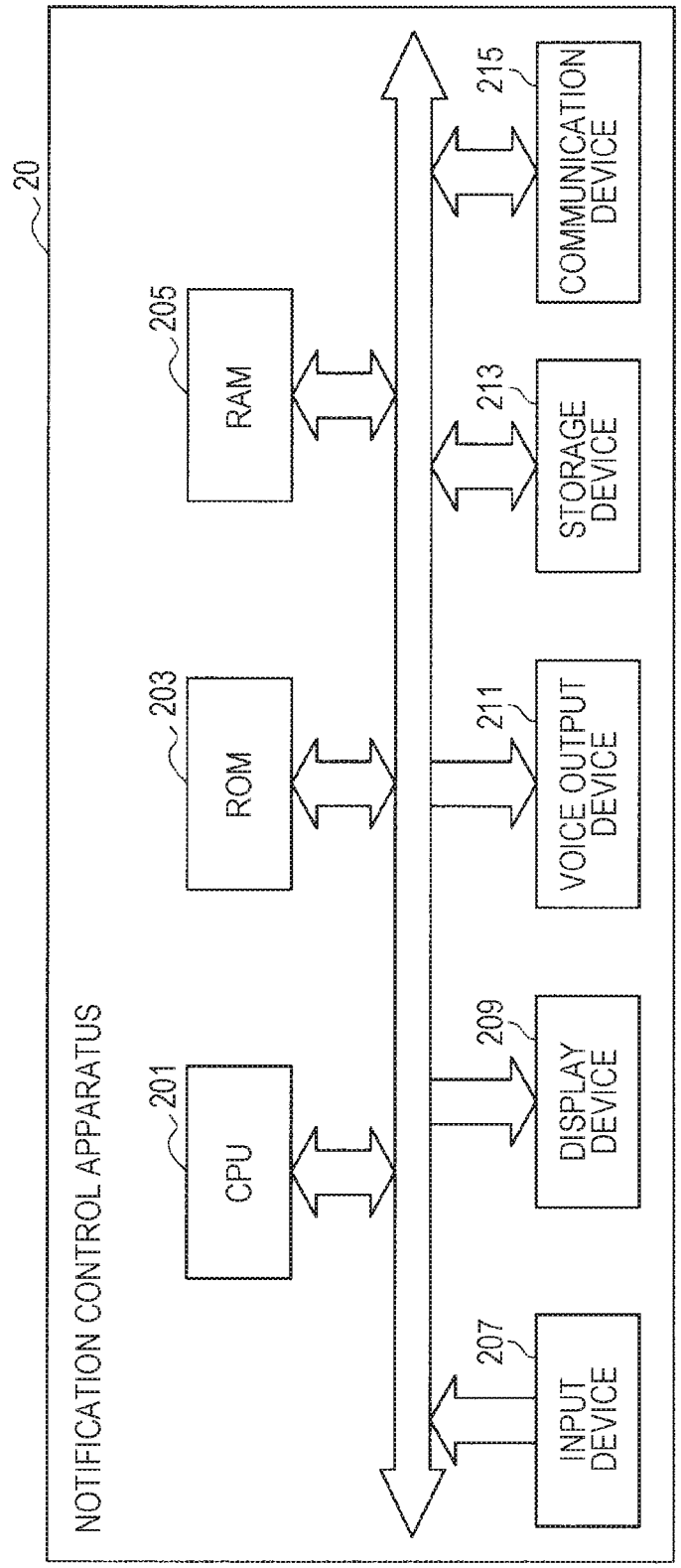
FIG. 13 is an explanatory diagram illustrating a hardware configuration of the notification control apparatus according to the embodiment.

FIG. 13 is a block diagram illustrating a hardware configuration of the notification control apparatus 20. The notification control apparatus 20 includes a central processing unit (CPU) 201, a read only memory (ROM) 203, and a random access memory (RAM) 205. Furthermore, the notification control apparatus 20 includes an input device 207, a display device 209, a voice output device 211, a storage device 213, and a communication device 215.

The CPU 201 functions as an arithmetic processing device and a control device, and generally controls an operation in the notification control apparatus 20 according to various programs. Furthermore, the CPU 201 may be a microprocessor. The ROM 203 stores programs, operation parameters or the like used by the CPU 201. The RAM 205 temporarily stores programs used in execution of the CPU 201, parameters appropriately changed in the execution, or the like. The CPU 201, the ROM 203, and the RAM 205 are connected to each other by a host bus including a CPU bus and the like. The CPU 201, the ROM 203, and the RAM 205 can realize the function of the control unit 240 described with reference to FIG. 2 in cooperation with software.

The input device 207 includes input means for a user to input information, such as a touch panel, a button, a camera, a microphone, a sensor, a switch, a lever, and the like, an input control circuit generating an input signal on the basis of an input by the user and outputting the generated input signal to the CPU 201, and the like. The user of the notification control apparatus 20 inputs various data to the notification control apparatus 20 or instructs the notification control apparatus 20 to perform a processing operation by operating the input device 207.

The display device 209 includes, for example, a display unit such as a cathode ray tube (CRT) display device, a liquid crystal display (LCD) device, a projector device, an organic light emitting diode (OLED) device, a lamp, and the like. Furthermore, the voice output device 211 includes a voice output device such as a speaker, a headphone and the like.

The storage device 213 is a device for storing data. The storage device 213 may include a storage medium, a recording device recording data in the storage medium, a reading device reading data from the storage medium, a deleting device deleting data recorded in the storage medium, and the like. The storage device 213 includes, for example, a hard disk drive (HDD) or a solid strage drive (SSD), a memory having an equivalent function, or the like. The storage device 213 drives a storage, and stores programs executed by the CPU 201 or various data.

The communication device 215 is, for example, a communication interface including a communication device and the like for connecting to the network 17 and the network 19. Such a communication interface is, for example, a near field communication interface such as Bluetooth (registered trademark), ZigBee (registered trademark) and the like or a communication interface such as a wireless local area network (LAN), Wi-Fi (registered trademark), a mobile communication network (long term evolution (LTE) or 3G) and the like. Furthermore, the communication device 215 may be a wired communication device that performs wired communication.

4. Summary

According to the above description, in the service capable of transmitting and receiving the message between the user 10 and another user 13, the notification control apparatus 20 can determine whether or not to notify the user of the message on the basis of message transmitted from another user 13 to the user 10 and the user information of the user 10. Furthermore, the notification control apparatus 20 can control processing of notifying the user 10 of the message on the basis of a determination result, and can thus notify the user 10 of the message at an appropriate timing. As described above, it is possible to provide a new and improved information processing apparatus, program, and information processing method capable of further improving convenience of the communication service.

Hereinabove, the preferred embodiments of the present disclosure have been described in detail with reference to the accompanying drawings, but the technical scope of the present disclosure is not limited to such embodiments. It will be apparent to those skilled in the art of the present disclosure that various modifications or alterations can be conceived within the scope of the technical idea described in the claims, and it is naturally understood that these modifications or alterations also fall within the technical scope of the present disclosure.

Note that the notification control apparatus 20 described in the present specification may be realized as a single apparatus, or may be partially or wholly realized as a separate apparatus. For example, the communication unit 220, the control unit 240, and the storage unit 250 among the components of the notification control apparatus 20 illustrated in FIG. 2 may be provided in the apparatus such as the server and the like connected to the input unit 230 and the output unit 260 via a network and the like.

Furthermore, a series of processing by each apparatuses described in the present specification may be realized using any of software, hardware, and a combination of software and hardware. Programs configuring the software are stored in advance in, for example, a recording medium (non-transitory medium) provided inside or outside each apparatus. Then, each program is read into a RAM when being executed by, for example, a computer, and is executed by a processor such as a CPU and the like.

Furthermore, the processing described using the flowchart and the sequence diagram in the present specification may not necessarily be performed in the illustrated order. Several processing steps may be performed in parallel. Furthermore, additional processing steps may be adopted and some processing steps may be omitted.

Furthermore, the effects described in the present specification are only illustrative or exemplary rather than being restrictive. That is, the technology according to the present disclosure can accomplish other effects apparent to those skilled in the art from the description of the present specification, in addition to or instead of the effects described above.

Note that the following configurations also fall within the technical scope of the present disclosure.

(1)

An information processing apparatus including:

a first acquiring unit that acquires first messages transmitted from other users to a user in a service configured to transmit and receive messages between the user and the other users;

a second acquiring unit that acquires user information regarding the user;

a determining unit that determines whether or not to notify the user of the first messages on the basis of the first messages and the user information; and a notification control unit that controls notification processing of notifying the user of the first messages determined to be notified to the user by the determining unit.

(2)

The information processing apparatus according to the above (1), in which the first acquiring unit acquires the first messages which are unopened among the first messages.

(3)

The information processing apparatus according to the above (2), in which the determining unit determines to notify the user of the first message whose priority of notifying the user of the first message is a first priority, and determines whether or not to notify the user of the first message whose priority is a second priority lower than the first priority, among the first messages that are unopened.

(4)

The information processing apparatus according to the above (3), in which the determining unit analyzes a content of the first message and generates a trigger condition for notifying the user of the first message, in a case where the priority of the first message is the second priority.

(5)

The information processing apparatus according to the above (4), in which the determining unit determines whether or not the trigger condition is satisfied on the basis of the user information, and determines to notify the user of the first message corresponding to the trigger condition determined to be satisfied.

(6)

The information processing apparatus according to any one of the above (1) to (5), in which the determining unit determines whether or not to notify the user of the first message on the basis of whether the first message is addressed to the user or to a plurality of users including the user.

(7)

The information processing apparatus according to any one of the above (1) to (6), in which the notification control unit notifies the user of first notification information asking the user whether or not to output content on the basis of the first message including the content or including information indicating an arrangement location of the content, and controls output processing of the content according to an answer of the user to the first notification information.

(8)

The information processing apparatus according to any one of the above (1) to (7), in which the notification control unit controls the notification processing so as to notify the user of second notification information in which contents of a plurality of the first messages are organized.

(9)

The information processing apparatus according to the above (8), in which the second notification information includes a table in which the contents of the plurality of the first messages received from a plurality of the other users are organized.

(10)

The information processing apparatus according to any one of the above (1) to (9), further including a transmission processing unit that instructs the service to generate and transmit a second message transmitted from the user to the other users, on the basis of the user information.

(11)

The information processing apparatus according to the above (10), in which the determining unit determines whether or not to notify the user of the first message on the basis of whether or not the first message is a reply to the second message.

(12)

The information processing apparatus according to any one of the above (1) to (11), in which the notification control unit controls the notification processing so as to notify the user of the message by a voice output device.

(13)

An information processing apparatus including:

a setting unit that performs a setting for whether or not to permit transmission and reception of messages between a user and other users on the basis of a state of the user indicated by user information in a service configured to transmit and receive the messages between the user and the other users.

(14)

The information processing apparatus according to the above (13), in which the setting unit searches for the other users to be permitted to transmit and receive the messages among the other users who are not permitted to transmit and receive the messages, on the basis of at least any one of a request of the user, profile information of the user, or a state of the user indicated by the user information, and performs a setting so as to permit transmission and reception of the messages between the other users to be permitted to transmit and receive the messages and the user.

(15)

The information processing apparatus according to the above (14), in which the setting unit performs a setting so as to temporarily permit the transmission and the reception of the messages between the user and the other users to be permitted to transmit and receive the messages during a period in which the user satisfies a predetermined condition.

(16)

A program for causing a computer to function as:

a first acquiring unit that acquires first messages transmitted from other users to a user in a service configured to transmit and receive messages between the user and the other users;

a second acquiring unit that acquires user information regarding the user;

a determining unit that determines whether or not to notify the user of the first messages on the basis of the first messages and the user information; and a notification control unit that controls notification processing of notifying the user of the first messages determined to be notified to the user by the determining unit.

(17)

An information processing method executed by a processor, including:

acquiring first messages transmitted from other users to a user in a service configured to transmit and receive messages between the user and the other users;

acquiring user information regarding the user;

determining whether or not to notify the user of the first messages on the basis of the first messages and the user information; and controlling notification processing of notifying the user of the first messages determined to be notified to the user by a determining unit.

REFERENCE SIGNS LIST

10 User
11 Cooperation service server
13 Other users (or Another user)
15 Content distribution server
17 Network
19 Network
20 Notification control apparatus
220 Communication unit
230 Input unit
240 Control unit
242 Message acquiring unit
244 User information acquiring unit
245 Setting unit
246 Determining unit
247 Transmission processing unit
248 Notification control unit
250 Storage unit
260 Output unit

The invention claimed is:

1. An information processing apparatus comprising:
processing circuitry configured to
acquire first messages transmitted from other users to a user in a service configured to transmit and receive messages between the user and the other users;
acquire user information regarding the user;
determine whether or not to notify the user of the first messages on a basis of the first messages and the user information; and
control notification processing of notifying the user of the first messages determined to be notified to the user, wherein
the processing circuitry determines whether or not to notify the user of the first messages by (1) determining to notify the user of the first message whose priority of notifying the user of the first message is a first priority, and (2) in a case where the priority of the first message is a second priority lower than the first priority, analyzing a content of the first message, generating based on the content of the first message, a trigger condition that triggers notifying the user of the first message, and determining to notify the user of the first message in case where the user information satisfies the generated trigger condition.

2. The information processing apparatus according to claim 1, wherein the processing circuitry acquires the first messages which are unopened among the first messages.

3. The information processing apparatus according to claim 1, wherein the processing circuitry determines whether or not to notify the user of the first message on a basis of whether the first message is addressed to the user or to a plurality of users including the user.

4. The information processing apparatus according to claim 1, wherein the processing circuitry notifies the user of first notification information asking the user whether or not to output content on a basis of the first message including the content or including information indicating an arrangement location of the content, and controls output processing of the content according to an answer of the user to the first notification information.

5. The information processing apparatus according to claim 1, wherein the processing circuitry controls the notification processing so as to notify the user of second notification information in which contents of a plurality of the first messages are organized.

6. The information processing apparatus according to claim 5, wherein the second notification information includes a table in which the contents of the plurality of the first messages received from a plurality of the other users are organized.

7. The information processing apparatus according to claim 1, wherein the processing circuitry is configured to instruct the service to generate and transmit a second message transmitted from the user to the other users, on a basis of the user information.

8. The information processing apparatus according to claim 7, wherein the processing circuitry determines whether or not to notify the user of the first message on a basis of whether or not the first message is a reply to the second message.

9. The information processing apparatus according to claim 1, wherein the processing circuitry controls the notification processing so as to notify the user of the message by a voice output device.

10. The information processing apparatus according to claim 1, wherein
the user information includes a past user input to the information processing apparatus, and
the processing circuitry is configured to determine to notify the user of the first message in a case where the past user input satisfies the generated trigger condition.

11. The information processing apparatus according to claim 10, wherein
the trigger condition is whether the past user input includes a specific word, and
the processing circuitry is configured to determine to notify the user of the first message in case where the past user input includes the specific word.

12. The information processing apparatus according to claim 10, wherein
the trigger condition is whether the past user input includes a specific word, and
the processing circuitry is configured to generate the trigger condition based on the specific word included in the first message.

13. A non-transitory computer readable medium including executable instructions, which when executed by a computer cause the computer o execute an information processing method, the method comprising:
acquiring first messages transmitted from other users to a user in a service configured to transmit and receive messages between the user and the other users;
acquiring user information regarding the user;
determining whether or not to notify the user of the first messages on a basis of the first messages and the user information; and
controlling notification processing of notifying the user of the first messages determined to be notified to the user, wherein
the determining determines whether or not to notify the user of the first messages by (1) determining to notify the user of the first message whose priority of notifying the user of the first message is a first priority, and (2) in a case where the priority of the first message is a second priority lower than the first priority analyzing a content of the first message, generating, based on the content of the first message, a trigger condition that triggers notifying the user of the first message, and determining to notify the user of the first message in case where the user information satisfies the generated trigger condition.

14. An information processing method executed by a processor, comprising:
acquiring first messages transmitted from other users to a user in a service configured to transmit and receive messages between the user and the other users;
acquiring user information regarding the user;
determining whether or not to notify the user of the first messages on a basis of the first messages and the user information; and
controlling notification processing of notifying the user of the first messages determined to be notified to the user, wherein
the determining determines whether or not to notify the user of the first messages by (1) determining to notify the user of the first message whose priority of notifying the user of the first message is a first priority, and (2) in a case where the priority of the first message is a second priority lower than the first priority, analyzing a content of the first message, generating, based on the content of the first message, a trigger condition that triggers notifying the user of the first message, and determining to notify the user of the first message in case where the user information satisfies the generated trigger condition.

* * * * *